United States Patent
Fang

(10) Patent No.: US 9,954,369 B2
(45) Date of Patent: *Apr. 24, 2018

(54) POWER SUPPLY METHOD AND APPARATUS

(71) Applicant: HUAWEI TECHNOLOGIES CO., LTD., Shenzhen, Guangdong (CN)

(72) Inventor: Qingyin Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

This patent is subject to a terminal disclaimer.

(21) Appl. No.: 14/853,045

(22) Filed: Sep. 14, 2015

(65) Prior Publication Data

US 2016/0006247 A1 Jan. 7, 2016

Related U.S. Application Data

(63) Continuation of application No. 14/483,996, filed on Sep. 11, 2014, now Pat. No. 9,203,238, which is a continuation of application No. PCT/CN2013/084540, filed on Sep. 27, 2013.

(30) Foreign Application Priority Data

Mar. 6, 2013 (CN) .......................... 2013 1 0071433

(51) Int. Cl.
*H02J 9/06* (2006.01)
*H02J 7/00* (2006.01)
(Continued)

(52) U.S. Cl.
CPC .................. *H02J 3/36* (2013.01); *G06F 1/00* (2013.01); *G06F 1/30* (2013.01); *H02J 3/00* (2013.01);
(Continued)

(58) Field of Classification Search
CPC ........ H02J 3/00; H02J 3/36; H02J 7/00; H02J 9/00; H02J 9/06; H02J 9/061; H02M 7/44; G06F 1/00; G06F 1/30; Y10T 307/615
(Continued)

(56) References Cited

U.S. PATENT DOCUMENTS 5,001,623 A 3/1991 Magid
5,331,128 A 7/1994 Koh
(Continued)

FOREIGN PATENT DOCUMENTS

CN 1790864 A 6/2006
CN 101626166 A 1/2010
(Continued)

*Primary Examiner* — Hal Kaplan
(74) *Attorney, Agent, or Firm* — Huawei Technologies Co., Ltd.

(57) ABSTRACT

Embodiments of the present invention disclose a power supply method, including: rectifying a second alternating current, and converting the second alternating current into a second high voltage direct current; when the second high voltage direct current is abnormal, inputting a third high voltage direct current to a DC/DC module; when the second high voltage direct current is normal, inputting the second high voltage direct current to the DC/DC module; and converting, by the DC/DC module, the second high voltage direct current or the third high voltage direct current into a low voltage direct current for outputting.

30 Claims, 8 Drawing Sheets

(51) Int. Cl.
*H02J 9/00* (2006.01)
*H02M 7/44* (2006.01)
*H02J 3/36* (2006.01)
*H02J 3/00* (2006.01)
*G06F 1/00* (2006.01)
*G06F 1/30* (2006.01)

(52) U.S. Cl.
CPC .................. *H02J 7/00* (2013.01); *H02J 9/00* (2013.01); *H02J 9/06* (2013.01); *H02J 9/061* (2013.01); *H02M 7/44* (2013.01); *Y10T 307/615* (2015.04)

(58) Field of Classification Search
USPC ....................................................... 307/64, 66
See application file for complete search history.

(56) References Cited

U.S. PATENT DOCUMENTS

| | | | |
|---|---|---|---|
| 5,939,799 A | 8/1999 | Weinstein | |
| 6,181,029 B1 | 1/2001 | Berglund et al. | |
| 6,980,911 B2 | 12/2005 | Eaton et al. | |
| 7,468,566 B2 | 12/2008 | Serrano et al. | |
| 2011/0006607 A1 | 1/2011 | Kwon et al. | |
| 2011/0222258 A1 | 9/2011 | Malik et al. | |
| 2012/0267957 A1 | 10/2012 | Czarnecki | |
| 2013/0047030 A1 | 2/2013 | Soeda et al. | |

FOREIGN PATENT DOCUMENTS

| | | |
|---|---|---|
| CN | 101826821 A | 9/2010 |
| CN | 201584805 U | 9/2010 |
| CN | 101599641 B | 6/2011 |
| CN | 102214945 A | 10/2011 |
| CN | 102368631 A | 3/2012 |
| CN | 102394510 A | 3/2012 |
| CN | 102593938 A | 7/2012 |
| CN | 202353297 U | 7/2012 |
| CN | 101630918 B | 9/2012 |
| CN | 202455149 U | 9/2012 |
| CN | 102710004 A | 10/2012 |
| CN | 102710010 A | 10/2012 |
| CN | 102801204 A | 11/2012 |
| JP | 2007209195 A | 8/2007 |
| JP | 2007306778 A | 11/2007 |

POWER SUPPLY METHOD AND APPARATUS

CROSS-REFERENCE TO RELATED APPLICATIONS

This application is a continuation of U.S. patent application Ser. No. 14/483,996, filed on Sep. 11, 2014, which is a continuation of International Application No. PCT/CN2013/084540, filed on Sep. 27, 2013, which claims priority to Chinese Patent Application No. 201310071433.1, filed on Mar. 6, 2013, The afore-mentioned patent applications are hereby incorporated by reference in their entireties.

TECHNICAL FIELD

The present invention relates to the field of electronic communication technologies, and in particular, to a power supply method and apparatus.

BACKGROUND

Referring to FIG. 1, an existing data center (or an equipment room) uses an alternating current power supply mode. To ensure reliability of the power supply and power distribution for equipments of the whole data center, two sets of power supply systems are used to supply power in a redundant backup mode, and two mains supplies and diesel generators supply power to a lower-level load by using an ATS (Automatic Transfer Switches, automatic transfer switch) transfer equipment.

An alternating current output by the ATS is divided into two branches, a branch A and a branch B, by using an AC (Alternating Current, alternating current) distribution panel. The branch A is input to an UPS (Uninterruptible power supply, uninterruptible power supply) system A in the equipment room, and the branch B is input to a UPS system B in the equipment room. The alternating currents output by the UPS system A and UPS system B are output to an ICT (Information Communication Technology, information communication technology) equipment cabinet in the equipment room after passing through a distribution cabinet and an array cabinet respectively, to supply power to an ICT equipment.

Each ICT equipment cabinet receives the alternating currents output by the UPS system A and UPS system B. The alternating current (A-plane alternating current for short) from the UPS system A and the alternating current (B-plane alternating current for short) from the UPS system B back up each other. Equipments in the ICT equipment cabinet may be powered by the A-plane alternating current by using an A-channel distribution unit and the B-plane alternating current by using a B-channel distribution unit.

In the existing power supply mode, each power module receives only one alternating current. If there are N (N is an integer greater than zero) A-plane alternating current power supply and B-plane alternating current power supply that back up each other, N+N power modules are required ("power supply A1" to "power supply AN" and "power supply B1" to "power supply BN" in the figure). The number of power modules in an equipment is relatively large, and a cost is relatively high.

SUMMARY

Embodiments of the present invention provide a power supply method, a power module, a power supply apparatus, a power supply system, and an ICT equipment, which are capable of reducing costs.

An embodiment of the present invention provides a power supply method, which is applied to a power module, where the power module is configured to adjust at least one input voltage and output a voltage to a load to supply power to the load, where the power supply method includes:

rectifying an input second alternating current, and converting the second alternating current into a second high voltage direct current;

when detecting that the second high voltage direct current is abnormal, inputting an input third high voltage direct current to a DC/DC module; when detecting that the second high voltage direct current is normal, inputting the second high voltage direct current to the DC/DC module, where the input third high voltage direct current is in a standby state at this time; and converting, by the DC/DC module, the input second high voltage direct current or the third high voltage direct current into a low voltage direct current, and outputting the low voltage direct current to the load for use.

In the power supply method, before rectifying the input second alternating current, the power supply method further includes:

filtering the input second alternating current.

In the power supply method, before inputting the input third high voltage direct current to the DC/DC module, the power supply method further includes:

filtering the input third high voltage direct current.

In the power supply method, after rectifying the input second alternating current and before inputting the second alternating current to the DC/DC module, the power supply method further includes:

performing power factor correction for a voltage after the second alternating current is rectified.

An embodiment of the present invention further provides another power supply method, including:

converting an input first alternating current into a first high voltage direct current;

outputting, by a battery group, a standby high voltage direct current when the first high voltage direct current is abnormal, where a third high voltage direct current is output after the battery group and the first high voltage direct current are connected in parallel;

rectifying an input second alternating current, and converting the second alternating current into a second high voltage direct current;

when detecting that the second high voltage direct current is normal, inputting the second high voltage direct current to a DC/DC module, where the third high voltage direct current that is output after the battery group and the first high voltage direct current are connected in parallel is in a standby state at this time; and when detecting that the second high voltage direct current is abnormal, inputting the third high voltage direct current to the DC/DC module; and converting, by the DC/DC module, the input second high voltage direct current or the third high voltage direct current into a low voltage direct current, and outputting the low voltage direct current to a load for use.

In the another power supply method, before rectifying the input second alternating current, the power supply method further includes:

filtering the input second alternating current.

In the another power supply method, before inputting the third high voltage direct current to the DC/DC module, the power supply method further includes:

filtering the third high voltage direct current.

In the another power supply method, after rectifying the input second alternating current and before inputting the second alternating current to the DC/DC module, the power supply method further includes:

performing power factor correction for a voltage after the second alternating current is rectified.

An embodiment of the present invention further provides a power module, including a rectifier module, a selecting module, and a DC/DC module, where:

the rectifier module is configured to rectify an input second alternating current, and convert the second alternating current into a second high voltage direct current for outputting;

the selecting module is connected to channels for inputting two high voltage direct currents to the DC/DC module, where the two high voltage direct currents include the second high voltage direct current and a third high voltage direct current;

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to a load for use.

The power module further includes a first EMI module, where the first EMI module is configured to filter the third high voltage direct current, and output the filtered third high voltage direct current to the selecting module.

The power module further includes:

the second EMI module, configured to filter the input second alternating current, and output the filtered second alternating current to the rectifier module.

The power module further includes:

a PFC module, configured to perform power factor correction for a voltage after the second alternating current is rectified.

In the power module, in a first implementation manner, the selecting module includes:

a first voltage detecting module, configured to detect a voltage of the second high voltage direct current and that of the third high voltage direct current, and when detecting that the voltage of the second high voltage direct current is normal, output a disconnection signal to a second driver module and output a connection signal to a first driver module; when detecting that the voltage of the second high voltage direct current is abnormal, output a disconnection signal to the first driver module and output a connection signal to the second driver module;

the first driver module, configured to trigger, when receiving the disconnection signal, a first switch module to disconnect the channel for inputting the second high voltage direct current to the DC/DC module, and trigger, when receiving the connection signal and after the channel for inputting the third high voltage direct current to the DC/DC module is disconnected, the first switch module to connect the channel for inputting the second high voltage direct current to the DC/DC module;

the second driver module, configured to trigger, when receiving the connection signal and after the channel for inputting the second high voltage direct current to the DC/DC module is disconnected, a second switch module to connect the channel for inputting the third high voltage direct current to the DC/DC module, and trigger, when receiving the disconnection signal, the second switch module to disconnect the channel for inputting the third high voltage direct current to the DC/DC module;

the first switch module, connected between the second high voltage direct current and the DC/DC module, and configured to respond to driving of the first driver module, disconnect the channel for inputting the second high voltage direct current to the DC/DC module, and connect the channel for inputting the second high voltage direct current to the DC/DC module; and the second switch module, connected between the third high voltage direct current and the DC/DC module, and configured to respond to driving of the second driver module, disconnect the channel for inputting the third high voltage direct current to the DC/DC module, and connect the channel for inputting the third high voltage direct current to the DC/DC module.

In the power module, in a second implementation manner, the selecting module includes:

a second voltage detecting module, configured to: detect a voltage of the second high voltage direct current and that of the third high voltage direct current, and when detecting that the voltage of the second high voltage direct current is normal, output, to a third driver module, a signal for disconnecting the channel for inputting the third high voltage direct current to the DC/DC module, and a signal for connecting the channel for inputting the second high voltage direct current to the DC/DC module; when detecting that the voltage of the second high voltage direct current is abnormal, output, to the third driver module, a signal for disconnecting the channel for inputting the second high voltage direct current to the DC/DC module, and a signal for connecting the channel for inputting the third high voltage direct current to the DC/DC module;

the third driver module, configured to: trigger, when receiving the signal for disconnecting the channel for inputting the second high voltage direct current to the DC/DC module, and the signal for connecting the channel for inputting the third high voltage direct current to the DC/DC module, a third switch module to disconnect the channel for inputting the second high voltage direct current to the DC/DC module, and then trigger the third switch module to connect the channel for inputting the third high voltage direct current to the DC/DC module; and trigger, when receiving the signal for disconnecting the channel for inputting the third high voltage direct current to the DC/DC module, and the signal for connecting the channel for inputting the second high voltage direct current to the DC/DC module, the third switch module to disconnect the channel for inputting the third high voltage direct current to the DC/DC module, and then trigger the third switch module to connect the channel for inputting the second high voltage direct current to the DC/DC module; and the third switch module, connected between two high voltage direct currents and the DC/DC module, where the two high voltage direct currents are the second high voltage direct current and the third high voltage direct current, and configured to respond to driving of the third driver module, disconnect the channel for inputting the second high voltage direct current to the DC/DC module, and then connect the channel for inputting the third high voltage direct current to the DC/DC module; and respond to driving of the third driver module, disconnect the channel for inputting the third high voltage direct current to the DC/DC module, and then connect the channel for inputting the second high voltage direct current to the DC/DC module.

An embodiment of the present invention further provides a power supply apparatus, including an AC/DC module, a battery group, a rectifier module, a selecting module, and a DC/DC module, where:

the AC/DC module is configured to convert an input first alternating current into a first high voltage direct current for outputting;

the battery group is configured to output a standby high voltage direct current when the first high voltage direct current output by the AC/DC module is abnormal, where a third high voltage direct current is output after the battery group and the AC/DC module are connected in parallel;

the rectifier module is configured to rectify an input second alternating current, and convert the second alternating current into a second high voltage direct current for outputting;

the selecting module is connected to channels for inputting two high voltage direct currents to the DC/DC module, where the two high voltage direct currents include the second high voltage direct current and the third high voltage direct current;

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to a load for use.

The power supply apparatus further includes a first EMI module, where the first EMI module is configured to filter the third high voltage direct current, and output the filtered third high voltage direct current to the selecting module.

The power supply apparatus further includes a second EMI module, where the second EMI module is configured to filter the input second alternating current, and output the filtered second alternating current to the rectifier module.

The power supply apparatus further includes:

a PFC module, configured to perform power factor correction for a voltage after the second alternating current is rectified.

In the power supply apparatus, in a first implementation manner, the selecting module includes:

a first voltage detecting module, configured to detect a voltage of the second high voltage direct current and that of the third high voltage direct current, and when detecting that the voltage of the second high voltage direct current is normal, output a disconnection signal to a second driver module and output a connection signal to a first driver module; when detecting that the voltage of the second high voltage direct current is abnormal, output a disconnection signal to the first driver module and output a connection signal to the second driver module;

the first driver module, configured to trigger, when receiving the disconnection signal, a first switch module to disconnect the channel for inputting the second high voltage direct current to the DC/DC module, and trigger, when receiving the connection signal and after the channel for inputting the third high voltage direct current to the DC/DC module is disconnected, the first switch module to connect the channel for inputting the second high voltage direct current to the DC/DC module;

the second driver module, configured to trigger, when receiving the connection signal and after the channel for inputting the second high voltage direct current to the DC/DC module is disconnected, a second switch module to connect the channel for inputting the third high voltage direct current to the DC/DC module, and trigger, when receiving the disconnection signal, the second switch module to disconnect the channel for inputting the third high voltage direct current to the DC/DC module;

the first switch module, connected between the second high voltage direct current and the DC/DC module, and configured to respond to driving of the first driver module, disconnect the channel for inputting the second high voltage direct current to the DC/DC module, and connect the channel for inputting the second high voltage direct current to the DC/DC module; and the second switch module, connected between the third high voltage direct current and the DC/DC module, and configured to respond to driving of the second driver module, disconnect the channel for inputting the third high voltage direct current to the DC/DC module, and connect the channel for inputting the third high voltage direct current to the DC/DC module.

In the power supply apparatus, in a second implementation manner, the selecting module includes:

a second voltage detecting module, configured to: detect a voltage of the second high voltage direct current and that of the third high voltage direct current, and when detecting that the voltage of the second high voltage direct current is normal, output, to a third driver module, a signal for disconnecting the channel for inputting the third high voltage direct current to the DC/DC module, and a signal for connecting the channel for inputting the second high voltage direct current to the DC/DC module; when detecting that the voltage of the second high voltage direct current is abnormal, output, to the third driver module, a signal for disconnecting the channel for inputting the second high voltage direct current to the DC/DC module, and a signal for connecting the channel for inputting the third high voltage direct current to the DC/DC module;

the third driver module, configured to: trigger, when receiving the signal for disconnecting the channel for inputting the second high voltage direct current to the DC/DC module, and the signal for connecting the channel for inputting the third high voltage direct current to the DC/DC module, a third switch module to disconnect the channel for inputting the second high voltage direct current to the DC/DC module, and then trigger the third switch module to connect the channel for inputting the third high voltage direct current to the DC/DC module; and trigger, when receiving the signal for disconnecting the channel for inputting the third high voltage direct current to the DC/DC module, and the signal for connecting the channel for inputting the second high voltage direct current to the DC/DC module, the third switch module to disconnect the channel for inputting the third high voltage direct current to the DC/DC module, and then trigger the third switch module to connect the channel for inputting the second high voltage direct current to the DC/DC module; and the third switch module, connected between two high voltage direct currents and the DC/DC module, where the two high voltage direct currents are the second high voltage direct current and the third high voltage direct current, and configured to respond to driving of the third driver module, disconnect the channel for inputting the second high voltage direct current to the DC/DC module, and then connect the channel for inputting the third high voltage direct current to the DC/DC module; and respond to driving of the third driver module, disconnect the channel for inputting the third high voltage direct current to the DC/DC module, and then connect the channel for inputting the second high voltage direct current to the DC/DC module.

An embodiment of the present invention further provides a power supply system, including X AC/DC modules, W power modules, a power supply bus, and a battery group, where:

the power module is configured to adjust at least one input voltage and output the at least one input voltage to a load to supply power to the load, where the power module includes a rectifier module, a selecting module, and a DC/DC module;

the AC/DC module is configured to convert an input first alternating current into a first high voltage direct current for outputting;

where X first high voltage direct currents output by the X AC/DC modules are input to the power supply bus;

the battery group is configured to output a standby high voltage direct current when the first high voltage direct currents output by the X AC/DC modules are abnormal;

a third high voltage direct current is output after the battery group and the power supply bus are connected in parallel, where the third high voltage direct current is input to the W power modules;

the rectifier module is configured to rectify an input second alternating current, and convert the second alternating current into a second high voltage direct current for outputting;

the selecting module is connected to channels for inputting two high voltage direct currents to the DC/DC module, where the two high voltage direct currents include the second high voltage direct current and the third high voltage direct current;

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to the load for use;

where X and W are integers greater than 0.

The power supply system further includes a first EMI module, where the first EMI module is configured to filter the third high voltage direct current, and output the filtered third high voltage direct current to the selecting module.

The power supply system further includes a second EMI module, where the second EMI module is configured to filter the input second alternating current, and output the filtered second alternating current to the rectifier module.

The power supply system further includes:

a PFC module, configured to perform power factor correction for a voltage after the second alternating current is rectified.

In the power supply system, in a first implementation manner, the selecting module includes:

a first voltage detecting module, configured to detect a voltage of the second high voltage direct current and that of the third high voltage direct current, and when detecting that the voltage of the second high voltage direct current is normal, output a disconnection signal to a second driver module and output a connection signal to a first driver module; when detecting that the voltage of the second high voltage direct current is abnormal, output a disconnection signal to the first driver module and output a connection signal to the second driver module;

the first driver module, configured to trigger, when receiving the disconnection signal, a first switch module to disconnect the channel for inputting the second high voltage direct current to the DC/DC module, and trigger, when receiving the connection signal and after the channel for inputting the third high voltage direct current to the DC/DC module is disconnected, the first switch module to connect the channel for inputting the second high voltage direct current to the DC/DC module;

the second driver module, configured to trigger, when receiving the connection signal and after the channel for inputting the second high voltage direct current to the DC/DC module is disconnected, a second switch module to connect the channel for inputting the third high voltage direct current to the DC/DC module, and trigger, when receiving the disconnection signal, the second switch module to disconnect the channel for inputting the third high voltage direct current to the DC/DC module;

the first switch module, connected between the second high voltage direct current and the DC/DC module, and configured to respond to driving of the first driver module, disconnect the channel for inputting the second high voltage direct current to the DC/DC module, and connect the channel for inputting the second high voltage direct current to the DC/DC module; and the second switch module, connected between the third high voltage direct current and the DC/DC module, and configured to respond to driving of the second driver module, disconnect the channel for inputting the third high voltage direct current to the DC/DC module, and connect the channel for inputting the third high voltage direct current to the DC/DC module.

In the power supply system, in a second implementation manner, the selecting module includes:

a second voltage detecting module, configured to: detect a voltage of the second high voltage direct current and that of the third high voltage direct current, and when detecting that the voltage of the second high voltage direct current is normal, output, to a third driver module, a signal for disconnecting the channel for inputting the third high voltage direct current to the DC/DC module, and a signal for connecting the channel for inputting the second high voltage direct current to the DC/DC module; when detecting that the voltage of the second high voltage direct current is abnormal, output, to the third driver module, a signal for disconnecting the channel for inputting the second high voltage direct current to the DC/DC module, and a signal for connecting the channel for inputting the third high voltage direct current to the DC/DC module;

the third driver module, configured to: trigger, when receiving the signal for disconnecting the channel for inputting the second high voltage direct current to the DC/DC module, and the signal for connecting the channel for inputting the third high voltage direct current to the DC/DC module, a third switch module to disconnect the channel for inputting the second high voltage direct current to the DC/DC module, and then trigger the third switch module to connect the channel for inputting the third high voltage direct current to the DC/DC module; and trigger, when receiving the signal for disconnecting the channel for inputting the third high voltage direct current to the DC/DC module, and the signal for connecting the channel for inputting the second high voltage direct current to the DC/DC module, the third switch module to disconnect the channel for inputting the third high voltage direct current to the DC/DC module, and then trigger the third switch module to connect the channel for inputting the second high voltage direct current to the DC/DC module; and the third switch module, connected between two high voltage direct currents and the DC/DC module, where the two high voltage direct currents are the second high voltage direct current and the third high voltage direct current, and configured to respond to driving of the third driver module, disconnect the channel for inputting the second high voltage direct current to the DC/DC module, and then connect the channel for inputting the third high voltage direct current to the DC/DC module; and respond to driving of the third driver module, disconnect the channel for inputting the third high voltage direct current to the DC/DC module, and then connect the channel for inputting the second high voltage direct current to the DC/DC module.

In the power supply system, the X AC/DC modules are disposed in a power cabinet.

An embodiment of the present invention further provides an ICT equipment, including N power modules and M loads, where:

the power module is configured to adjust at least one input voltage and output the at least one input voltage to a load to supply power to the load, where the N power modules supply power to the M loads, and the power module includes a rectifier module, a selecting module, and a DC/DC module, where:

the rectifier module is configured to rectify an input second alternating current, and convert the second alternating current into a second high voltage direct current for outputting;

the selecting module is connected to channels for inputting two high voltage direct currents to the DC/DC module, where the two high voltage direct currents include the second high voltage direct current and a third high voltage direct current;

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to the load for use;

where N and M are integers greater than 0.

In the ICT equipment, the power module further includes a first EMI module, where the first EMI module is configured to filter the third high voltage direct current, and output the filtered third high voltage direct current to the selecting module.

In the ICT equipment, the power module further includes:

the second EMI module, configured to filter the input second alternating current, and output the filtered second alternating current to the rectifier module.

In the ICT equipment, the power module further includes:

a PFC module, configured to perform power factor correction for a voltage after the second alternating current is rectified.

The ICT equipment further includes m power modules, where the m power modules are used for redundant backup, and m is an integer greater than zero. The ICT equipment further includes a low voltage bus, where DC/DC modules of the N power modules and the m power modules output the low voltage direct current to the low voltage bus, and the M loads are connected to the low voltage bus so that power is supplied to the M loads.

In the ICT equipment, an overcurrent protection module is connected between at least one load in the M loads and the low voltage bus, where the overcurrent protection module is configured to provide overcurrent protection for the at least one load connected to the overcurrent protection module.

In the ICT equipment, the M loads may be further divided into multiple load areas, where each load area includes at least one load, and each load area is connected to the low voltage bus so that power is supplied to the M loads. An overcurrent protection module is connected between at least one load area in the multiple load areas and the low voltage bus, where the overcurrent protection module is configured to provide overcurrent protection for the at least one load area connected to the overcurrent protection module.

In the ICT equipment, in a first implementation manner, the selecting module includes:

a first voltage detecting module, configured to detect a voltage of the second high voltage direct current and that of the third high voltage direct current, and when detecting that the voltage of the second high voltage direct current is normal, output a disconnection signal to a second driver module and output a connection signal to a first driver module; when detecting that the voltage of the second high voltage direct current is abnormal, output a disconnection signal to the first driver module and output a connection signal to the second driver module;

the first driver module, configured to trigger, when receiving the disconnection signal, a first switch module to disconnect the channel for inputting the second high voltage direct current to the DC/DC module, and trigger, when receiving the connection signal and after the channel for inputting the third high voltage direct current to the DC/DC module is disconnected, the first switch module to connect the channel for inputting the second high voltage direct current to the DC/DC module;

the second driver module, configured to trigger, when receiving the connection signal and after the channel for inputting the second high voltage direct current to the DC/DC module is disconnected, a second switch module to connect the channel for inputting the third high voltage direct current to the DC/DC module, and trigger, when receiving the disconnection signal, the second switch module to disconnect the channel for inputting the third high voltage direct current to the DC/DC module;

the first switch module, connected between the second high voltage direct current and the DC/DC module, and configured to respond to driving of the first driver module, disconnect the channel for inputting the second high voltage direct current to the DC/DC module, and connect the channel for inputting the second high voltage direct current to the DC/DC module; and the second switch module, connected between the third high voltage direct current and the DC/DC module, and configured to respond to driving of the second driver module, disconnect the channel for inputting the third high voltage direct current to the DC/DC module, and connect the channel for inputting the third high voltage direct current to the DC/DC module.

In the ICT equipment, in a second implementation manner, the selecting module includes:

a second voltage detecting module, configured to: detect a voltage of the second high voltage direct current and that of the third high voltage direct current, and when detecting that the voltage of the second high voltage direct current is normal, output, to a third driver module, a signal for disconnecting the channel for inputting the third high voltage direct current to the DC/DC module, and a signal for connecting the channel for inputting the second high voltage direct current to the DC/DC module; when detecting that the voltage of the second high voltage direct current is abnormal, output, to the third driver module, a signal for disconnecting the channel for inputting the second high voltage direct current to the DC/DC module, and a signal for connecting the channel for inputting the third high voltage direct current to the DC/DC module;

the third driver module, configured to: trigger, when receiving the signal for disconnecting the channel for inputting the second high voltage direct current to the DC/DC module, and the signal for connecting the channel for inputting the third high voltage direct current to the DC/DC module, a third switch module to disconnect the channel for inputting the second high voltage direct current to the DC/DC module, and then trigger the third switch module to connect the channel for inputting the third high voltage direct current to the DC/DC module; and trigger, when receiving the signal for disconnecting the channel for inputting the third high voltage direct current to the DC/DC module, and the signal for connecting the channel for inputting the second high voltage direct current to the DC/DC module, the third switch module to disconnect the channel for inputting the third high voltage direct current to the DC/DC module, and then trigger the third switch module to connect the channel for inputting the second high voltage direct current to the DC/DC module; and the third switch module, connected between two high voltage direct currents and the DC/DC module, where the two high voltage direct currents are the second high voltage direct current and the third high voltage direct current, and configured to respond to driving of the third driver module, disconnect the channel for inputting the second high voltage direct current to the DC/DC module, and then connect the channel for inputting the third high voltage direct current to the DC/DC module; and respond to driving of the third driver module, disconnect the channel for inputting the third high voltage direct current to the DC/DC module, and then connect the channel for inputting the second high voltage direct current to the DC/DC module.

The above technical solutions have the following advantages:

It can be seen that, in the foregoing embodiments of the present invention, two voltages, that is, a voltage of a second alternating current and that of the third high voltage direct current, which back up each other, enter a power module. Because two power supply voltages backing up each other may be connected to the power module, more voltages may be connected to fewer power modules, thereby saving a power supply cost. Alternatively, because the power supply branch of the second alternating current does not require power backup, the power supply branch of the third high voltage direct current uses a battery group for power backup. Because neither of the two power supply branches uses a relatively expensive UPS equipment for power backup, and only the power supply branch of the third high voltage direct current uses a battery group for power backup, the power supply cost is low.

BRIEF DESCRIPTION OF DRAWINGS

To describe the technical solutions in the embodiments of the present invention or in the prior art more clearly, the following briefly introduces the accompanying drawings required for describing the embodiments or the prior art. It can be seen that, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. It can be seen that, the described embodiments are merely a part rather than all of the embodiments of the present invention. All other embodiments obtained by a person of ordinary skill in the art based on the embodiments of the present invention without creative efforts shall fall within the protection scope of the present invention.

First Power Supply Method

Figure 1:
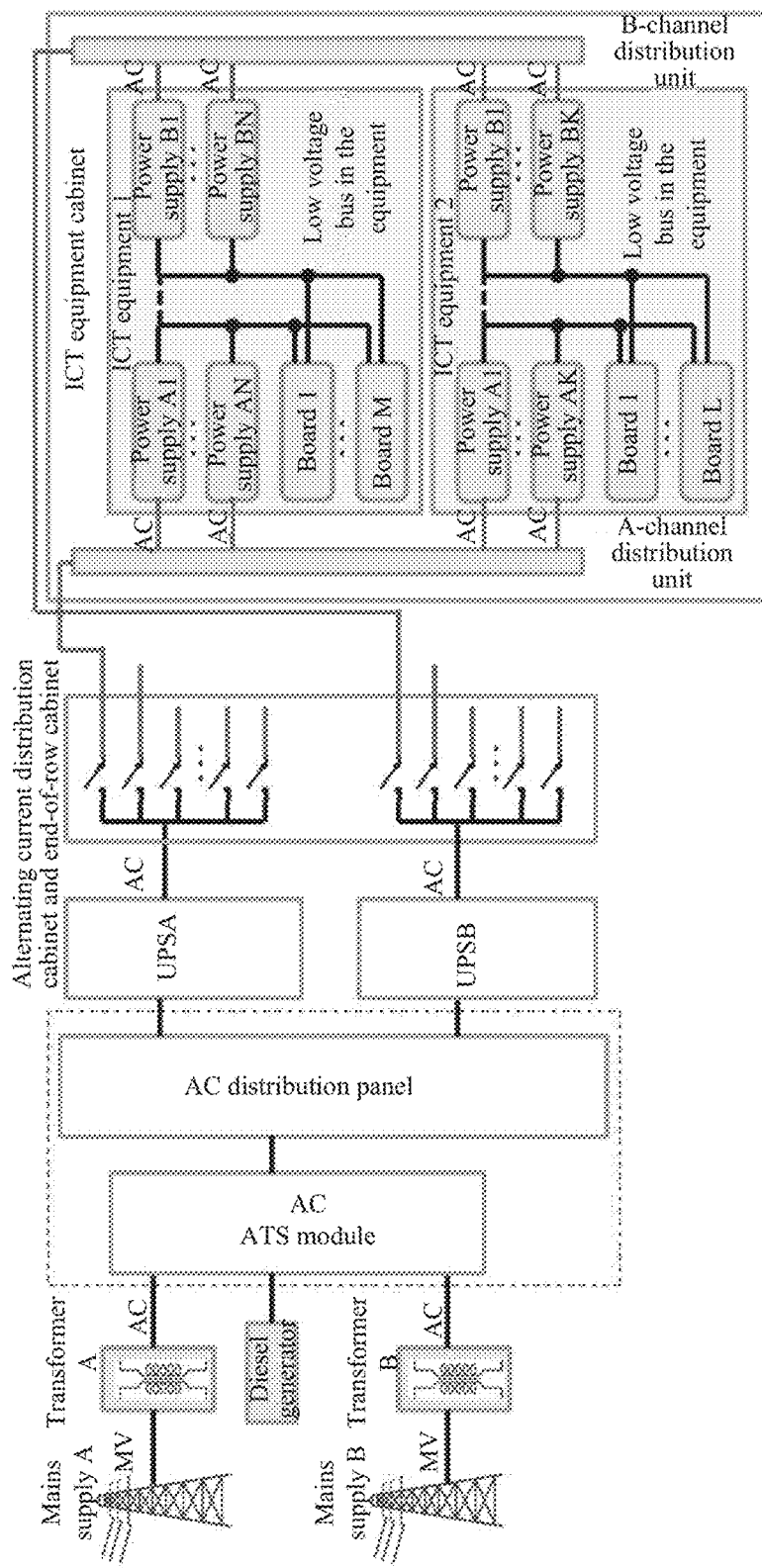
FIG. 1 is a schematic diagram of a power supply method of an existing data center (or an equipment room)
Figure 2:
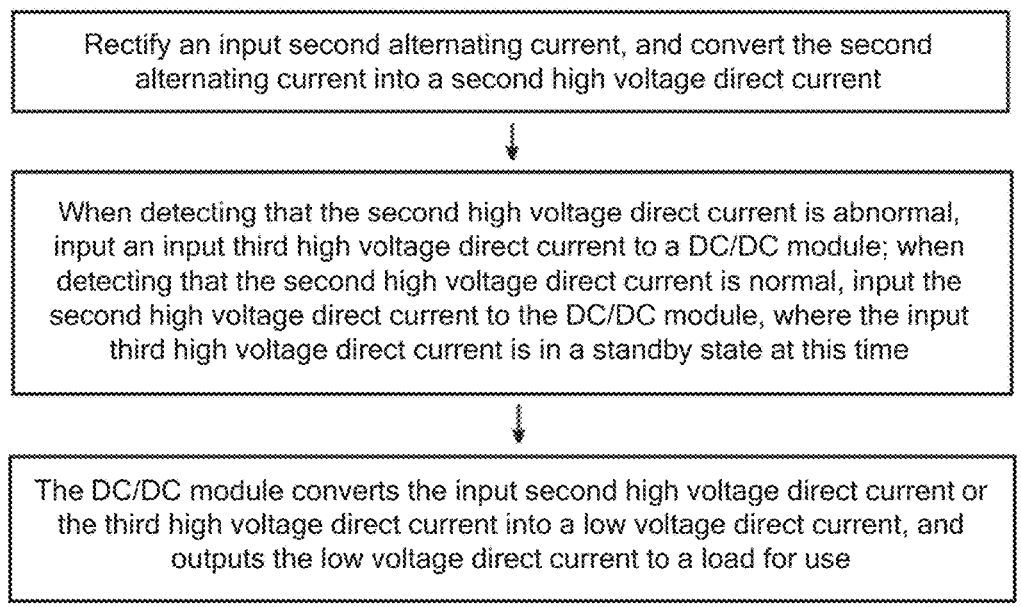
FIG. 2 is a schematic flowchart of a power supply method according to an embodiment of the present invention.

Referring to FIG. 2, the present invention provides an embodiment of a first power supply method, which is applied to a power module, where the power module is configured to adjust at least one input voltage and output the at least one input voltage to a load to supply power to the load, where the power supply method includes:

rectifying an input second alternating current, and converting the second alternating current into a second HVDC (High Voltage Direct Current, high voltage direct current);

when detecting that the second high voltage direct current is abnormal, inputting an input third high voltage direct current to a DC/DC module; when detecting that the second high voltage direct current is normal, inputting the second high voltage direct current to the DC/DC module, where the input third high voltage direct current is in a standby state at this time; and converting, by the DC/DC module, the input second high voltage direct current or the third high voltage direct current into a low voltage direct current, and outputting the low voltage direct current to the load for use.

It can be seen that, in the foregoing embodiment of the power supply method of the present invention, two voltages, that is, a voltage of a second alternating current and that of the third high voltage direct current, which back up each other, enter a power module. Because two power supply voltages backing up each other may be connected to the power module, more voltages may be connected to fewer power modules, thereby saving a power supply cost. Further, because fewer power modules are used, a size of an equipment containing the power modules may also be reduced.

In the foregoing embodiment of the power supply method of the present invention, before rectifying the input second alternating current, the power supply method may further include:

filtering the input second alternating current.

Before inputting the input third high voltage direct current to the DC/DC module, the power supply method further includes:

filtering the input third high voltage direct current.

After rectifying the input second alternating current and before inputting the second alternating current to the DC/DC module, the power supply method further includes:

performing power factor correction for a voltage after the second alternating current is rectified.

In the foregoing embodiment of the power supply method of the present invention, the first alternating current or the second alternating current may have different voltage specifications such as a 3-phase 380 V voltage, or a 3-phase 480 V voltage, or a single-phase 220 V voltage, or a single-phase 120 V voltage.

If power factor correction is performed for the second alternating current, when the second alternating current is 220 V, a normal range of a voltage of the second high voltage direct current is 350-450 V; when the second alternating current is 110 V, the normal range of the voltage of the second high voltage direct current is 130-250 V.

If power factor correction is not performed for the second alternating current, when the second alternating current is 220 V, the normal range of the voltage of the second high voltage direct current is 240-390 V; when the second alternating current is 110 V, the normal range of the voltage of the second high voltage direct current is 110-190 V.

In addition, according to load requirements, or according to bearing capabilities of hardware in a power supply system, the normal range of the voltage of the second high voltage direct current and that of the third high voltage direct current may be adjusted.

That the second high voltage direct current is normal means that the voltage of the second high voltage direct current is within the normal range.

That the second high voltage direct current is abnormal means that the voltage of the second high voltage direct current is beyond the normal range. In this case, overvoltage occurs in the second alternating current, or undervoltage occurs in the second alternating current, or the voltage of the second alternating current is lost (no voltage exists), or a frequency of the second alternating current is abnormal, or wave form distortion occurs in the second alternating current.

A normal range of a voltage of a first high voltage direct current is 260-400 V. That the first high voltage direct current is normal means that the voltage of the first high voltage direct current is within the normal range. That the first high voltage direct current is abnormal means that the voltage of the first high voltage direct current is beyond the normal range.

The normal range of the voltage of the third high voltage direct current is 260-400 V. That the third high voltage direct current is normal means that the voltage of the third high voltage direct current is within the normal range. That the third high voltage direct current is abnormal means that the voltage of the third high voltage direct current is beyond the normal range.

Second Power Supply Method

Figure 3:
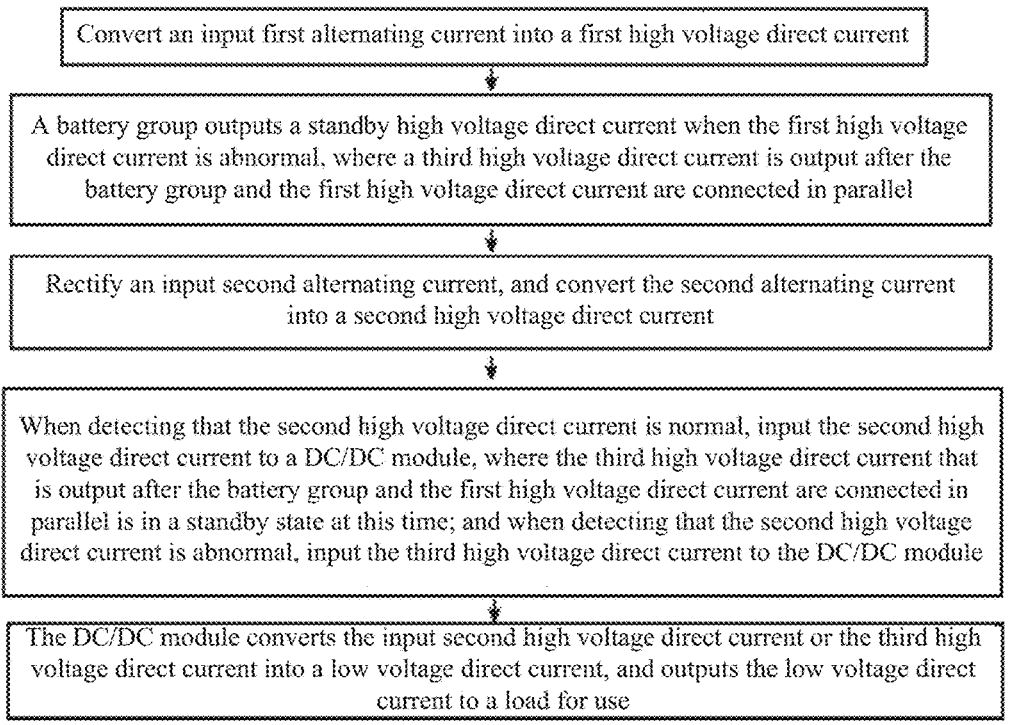
FIG. 3 is a schematic flowchart of another power supply method according to an embodiment of the present invention.

Referring to FIG. 3, the present invention provides an embodiment of a second power supply method, including:

converting an input first alternating current into a first high voltage direct current;

outputting, by a battery group, a standby high voltage direct current when the first high voltage direct current is abnormal, where a third high voltage direct current is output after the battery group and the first high voltage direct current are connected in parallel;

rectifying an input second alternating current, and converting the second alternating current into a second high voltage direct current;

when detecting that the second high voltage direct current is normal, inputting the second high voltage direct current to a DC/DC module, where the third high voltage direct current that is output after the battery group and the first high voltage direct current are connected in parallel is in a standby state at this time; and when detecting that the second high voltage direct current is abnormal, inputting the third high voltage direct current to the DC/DC module; and converting, by the DC/DC module, the input second high voltage direct current or the third high voltage direct current into a low voltage direct current, and outputting the low voltage direct current to a load for use.

It can be seen that, in the foregoing embodiment of the power supply method of the present invention, two power supply branches exist. One is a power supply branch A that uses the first alternating current as an input, and the other is a power supply branch B that uses the second alternating current as an input.

In the embodiment of the present invention, the power supply branch B supplies power when the second alternating current is normal, and the power supply branch A supplies power when the second alternating current is abnormal. In the power supply branch A, the first alternating current supplies power when the first alternating current is normal, and a battery group supplies power when the first alternating current is abnormal. That the first alternating current is abnormal means that: overvoltage occurs in the first alternating current, or undervoltage occurs in the first alternating current, or a voltage of the first alternating current is lost (no voltage exists), or a frequency of the first alternating current is abnormal, or wave form distortion occurs in the first alternating current. That the first alternating current is normal means that the first alternating current is in a state other than the abnormal state. That the second alternating current is abnormal means that: overvoltage occurs in the second alternating current, or undervoltage occurs in the second alternating current, or a voltage of the second alternating current is lost (no voltage exists), or a frequency of the second alternating current is abnormal, or wave form distortion occurs in the second alternating current. That the second alternating current is normal means that the second alternating current is in a state other than the abnormal state.

In the foregoing embodiment of the power supply method, because the power supply branch of the second alternating current does not require power backup, the power supply branch of the third high voltage direct current uses a battery group for power backup. Because neither of the two power supply branches uses a relatively expensive UPS equipment for power backup, and only the power supply branch of the third high voltage direct current uses a battery group for power backup, a power supply cost is low. Furthermore, when the second alternating current is normal, the second alternating current supplies power. In this case, only a few power conversion steps exist, and power supply and distribution efficiency is improved.

In addition, because the AC/DC module and the battery group are connected in parallel, after the battery group is discharged, when the first alternating current and the second alternating current are restored to normal, the second alternating current supplies power to the load. The first high voltage direct current output after the first alternating current passes through the AC/DC module charges the battery group, and the battery group enters a float charging state after being fully charged.

In the foregoing embodiment of the power supply method of the present invention, before rectifying the input second alternating current, the power supply method may further include:

filtering the input second alternating current.

Before inputting the third high voltage direct current to the DC/DC module, the power supply method may further include:

filtering the third high voltage direct current.

After rectifying the input second alternating current and before inputting the second alternating current to the DC/DC module, the power supply method may further include:

performing power factor correction for a voltage after the second alternating current is rectified.

In the foregoing embodiment of the power supply method of the present invention, the first alternating current or the second alternating current may have different voltage specifications such as a 3-phase 380 V voltage, or a 3-phase 480 V voltage, or a single-phase 220 V voltage, or a single-phase 120 V voltage.

If power factor correction is performed for the second alternating current, when the second alternating current is 220 V, a normal range of a voltage of the second high voltage direct current is 350-450 V; when the second alternating current is 110 V, the normal range of the voltage of the second high voltage direct current is 130-250 V.

If power factor correction is not performed for the second alternating current, when the second alternating current is 220 V, the normal range of the voltage of the second high voltage direct current is 240-390 V; when the second alternating current is 110 V, the normal range of the voltage of the second high voltage direct current is 110-190 V.

In addition, according to load requirements, or according to bearing capabilities of hardware in a power supply system, the normal range of the voltage of the second high voltage direct current and that of the third high voltage direct current may be adjusted.

That the second high voltage direct current is normal means that the voltage of the second high voltage direct current is within the normal range.

That the second high voltage direct current is abnormal means that the voltage of the second high voltage direct current is beyond the normal range. In this case, overvoltage occurs in the second alternating current, or undervoltage occurs in the second alternating current, or the voltage of the second alternating current is lost (no voltage exists), or the frequency of the second alternating current is abnormal, or wave form distortion occurs in the second alternating current.

A normal range of a voltage of a first high voltage direct current is 260-400 V. That the first high voltage direct current is normal means that the voltage of the first high voltage direct current is within the normal range. That the first high voltage direct current is abnormal means that the voltage of the first high voltage direct current is beyond the normal range.

The normal range of the voltage of the third high voltage direct current is 260-400 V. That the third high voltage direct current is normal means that the voltage of the third high voltage direct current is within the normal range. That the third high voltage direct current is abnormal means that the voltage of the third high voltage direct current is beyond the normal range.

In the foregoing embodiment of the power supply method of the present invention, a mains supply may be converted into the first alternating current and the second alternating current in the following two manners:

First Manner:

In the foregoing embodiment of the power supply method of the present invention, two mains supplies are input, where the two mains supplies include a first mains supply A and a second mains supply B.

When the first mains supply A is normal, the first mains supply A is divided into two branches for outputting, where one branch is the first alternating current and the other branch is the second alternating current.

When the first mains supply A is abnormal, and the second mains supply B is normal, the second mains supply B is divided into two branches for outputting, where one branch is the first alternating current and the other branch is the second alternating current.

When both the first mains supply A and the second mains supply B are abnormal, a diesel generator generates power and generates an alternating current. The alternating current generated by the diesel generator is divided into two branches for outputting, where one branch is the first alternating current, and the other branch is the second alternating current.

That the first mains supply A is abnormal means that: overvoltage occurs in the first mains supply A, or undervoltage occurs in the first mains supply A, or a voltage of the first mains supply A is lost (no voltage exists), or a frequency of the first mains supply A is abnormal, or wave form distortion occurs in the first mains supply A. That the first mains supply A is normal means that the first mains supply A is in a state other than the abnormal state.

That the second mains supply B is abnormal means that: overvoltage occurs in the second mains supply B, or undervoltage occurs in the second mains supply B, or a voltage of the second mains supply B is lost (no voltage exists), or a frequency of the second mains supply B is abnormal, or wave form distortion occurs in the second mains supply B. That the second mains supply B is normal means that the second mains supply B is in a state other than the abnormal state.

Second Manner:

In the foregoing embodiment of the power supply method of the present invention, a mains supply is input. When the mains supply is normal, the mains supply is divided into two branches for outputting, where one branch is the first alternating current, and the other branch is the second alternating current. When the mains supply is abnormal, the alternating current generated by the diesel generator through power generation is divided into two branches for outputting, where one branch is the first alternating current, and the other branch is the second alternating current.

That the mains supply is abnormal means that: overvoltage occurs in the mains supply, or undervoltage occurs in the mains supply, or a voltage of the mains supply is lost (no voltage exists), or a frequency of the mains supply is abnormal, or wave form distortion occurs in the mains supply. That the mains supply is normal means that the mains supply is in a state other than the abnormal state.

Power Module

Figure 4:
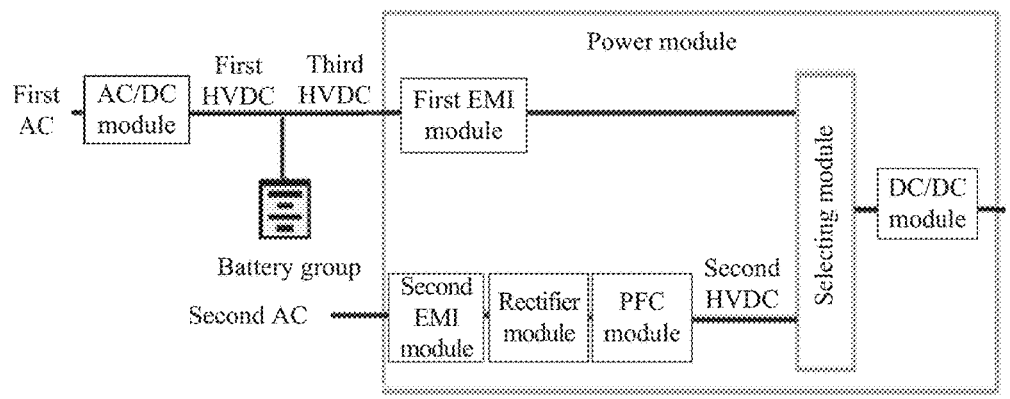
FIG. 4 is a schematic diagram of a power supply apparatus according to an embodiment of the present invention.

Referring to FIG. 4, the present invention provides an embodiment of a power module. The power module includes a rectifier module, a selecting module, and a DC/DC module, where: the rectifier module is configured to rectify an input second alternating current (second AC), and convert the second alternating current into a second high voltage direct current (second AC) for outputting;

the selecting module is connected to channels for inputting two high voltage direct currents to the DC/DC module, where the two high voltage direct currents include the second high voltage direct current and a third high voltage direct current (third HVDC);

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to a load for use.

It can be seen that, in the foregoing embodiment of the power module of the present invention, two voltages, that is, a voltage of a second alternating current and that of the third high voltage direct current, which back up each other, enter a power module. Because two power supply voltages backing up each other may be connected to the power module, more voltages may be connected to fewer power modules, thereby saving a power supply cost. Further, because fewer power modules are used, a size of an equipment containing the power modules may also be reduced.

Further, in the power module, although there are two branches, where one branch is a branch of the second alternating current, and the other branch is a branch of the third high voltage direct current, only one DC/DC module may be disposed to further save the cost.

Further, referring to FIG. 4, in the foregoing embodiment of the power module of the present invention, the power module may further include a first EMI module, where the first EMI module is configured to filter the third high voltage direct current, and output the filtered third high voltage direct current to the selecting module.

Further, the power module may further include:

the second EMI module, configured to filter the input second alternating current (second AC), and output the filtered second alternating current to the rectifier module.

Further, the power module may further include:

a PFC module, configured to perform power factor correction for a voltage after the second alternating current is rectified.

In the foregoing embodiment of the power module of the present invention, the first EMI module is further configured for lightning protection, and the second EMI module is further configured for lightning protection.

In the foregoing embodiment of the power module of the present invention, the first alternating current or the second alternating current may have different voltage specifications such as a 3-phase 380 V voltage, or a 3-phase 480 V voltage, or a single-phase 220 V voltage, or a single-phase 120 V voltage.

If power factor correction is performed for the second alternating current, when the second alternating current is 220 V, a normal range of a voltage of the second high voltage direct current is 350-450 V; when the second alternating current is 110 V, the normal range of the voltage of the second high voltage direct current is 130-250 V.

If power factor correction is not performed for the second alternating current, when the second alternating current is 220 V, the normal range of the voltage of the second high voltage direct current is 240-390 V; when the second alternating current is 110 V, the normal range of the voltage of the second high voltage direct current is 110-190 V.

In addition, according to load requirements, or according to bearing capabilities of the power module and hardware in a power supply system in which the power module is located, the normal range of the voltage of the second high voltage direct current and that of the third high voltage direct current may be adjusted.

That the second high voltage direct current is normal means that the voltage of the second high voltage direct current is within the normal range.

That the second high voltage direct current is abnormal means that the voltage of the second high voltage direct current is beyond the normal range. In this case, overvoltage occurs in the second alternating current, or undervoltage occurs in the second alternating current, or the voltage of the second alternating current is lost (no voltage exists), or a frequency of the second alternating current is abnormal, or wave form distortion occurs in the second alternating current.

A normal range of a voltage of a first high voltage direct current is 260-400 V. That the first high voltage direct current is normal means that the voltage of the first high voltage direct current is within the normal range. That the first high voltage direct current is abnormal means that the voltage of the first high voltage direct current is beyond the normal range.

The normal range of the voltage of the third high voltage direct current is 260-400 V. That the third high voltage direct current is normal means that the voltage of the third high voltage direct current is within the normal range. That the third high voltage direct current is abnormal means that the voltage of the third high voltage direct current is beyond the normal range.

In the power module of the present invention, an implementation manner of a selecting module in a subsequent embodiment of a power supply apparatus may be used for the selecting module.

Power Supply Apparatus

Further, referring to FIG. 4, the present invention provides an embodiment of a power supply apparatus. The power supply apparatus includes an AC/DC module, a battery group, a rectifier module, a selecting module, and a DC/DC module, where:

the AC/DC module is configured to convert an input first alternating current (first AC) into a first high voltage direct current (first HVDC) for outputting;

the battery group is configured to output a standby high voltage direct current when the first high voltage direct current output by the AC/DC module is abnormal, where a third high voltage direct current (third HVDC) is output after the battery group and the AC/DC module are connected in parallel;

the rectifier module is configured to rectify an input second alternating current, and convert the second alternating current into a second high voltage direct current (second HVDC) for outputting;

the selecting module is connected to channels for inputting two high voltage direct currents to the DC/DC module, where the two high voltage direct currents include the second high voltage direct current and the third high voltage direct current;

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to a load for use.

In the foregoing embodiment of the power supply apparatus, because the power supply branch of the second alternating current does not require power backup, the power supply branch of the third high voltage direct current uses a battery group for power backup. Because neither of the two power supply branches uses a relatively expensive UPS equipment for power backup, and only the power supply branch of the third high voltage direct current uses a battery group for power backup, a power supply cost is low. Furthermore, when the second alternating current is normal, the second alternating current supplies power. In this case, only a few power conversion steps exist, and power supply and distribution efficiency is improved.

The foregoing embodiment of the power supply apparatus of the present invention may be applied to a data center or an equipment room. Furthermore, if load power of the data center or the equipment room is high, multiple power supply apparatuses may be disposed to supply power to the load.

In the foregoing embodiment of the power supply apparatus of the present invention, two power supply branches exist. One is a power supply branch A that uses the first alternating current as an input, and the other is a power supply branch B that uses the second alternating current as an input.

In the embodiment of the present invention, the power supply branch B supplies power when the second alternating current is normal, and the power supply branch A supplies power when the second alternating current is abnormal. In the power supply branch A, the first alternating current supplies power when the first alternating current is normal, and a battery group supplies power when the first alternating current is abnormal. That the first alternating current is abnormal means that: overvoltage occurs in the first alternating current, or undervoltage occurs in the first alternating current, or a voltage of the first alternating current is lost (no voltage exists), or a frequency of the first alternating current is abnormal, or wave form distortion occurs in the first alternating current. That the first alternating current is normal means that the first alternating current is in a state other than the abnormal state. That the second alternating current is abnormal means that: overvoltage occurs in the second alternating current, or undervoltage occurs in the second alternating current, or a voltage of the second alternating current is lost (no voltage exists), or a frequency of the second alternating current is abnormal, or wave form distortion occurs in the second alternating current. That the second alternating current is normal means that the second alternating current is in a state other than the abnormal state.

In addition, because the AC/DC module and the battery group are connected in parallel, after the battery group is discharged, when the first alternating current and the second alternating current are restored to normal, the second alternating current supplies power to the load. The first high voltage direct current output after the first alternating current passes through the AC/DC module charges the battery group, and the battery group enters a float charging state after being fully charged.

In the foregoing embodiment of the power supply apparatus of the present invention, the first alternating current or the second alternating current may have different voltage specifications such as a 3-phase 380 V voltage, or a 3-phase 480 V voltage, or a single-phase 220 V voltage, or a single-phase 120 V voltage.

If power factor correction is performed for the second alternating current, when the second alternating current is 220 V, a normal range of a voltage of the second high voltage direct current is 350-450 V; when the second alternating current is 110 V, the normal range of the voltage of the second high voltage direct current is 130-250 V.

If power factor correction is not performed for the second alternating current, when the second alternating current is 220 V, the normal range of the voltage of the second high voltage direct current is 240-390 V; when the second alternating current is 110 V, the normal range of the voltage of the second high voltage direct current is 110-190 V.

In addition, according to load requirements, or according to bearing capabilities of the power supply apparatus and hardware in a power supply system in which the power supply apparatus is located, the normal range of the voltage of the second high voltage direct current and that of the third high voltage direct current may be adjusted.

That the second high voltage direct current is normal means that the voltage of the second high voltage direct current is within the normal range.

That the second high voltage direct current is abnormal means that the voltage of the second high voltage direct current is beyond the normal range. In this case, overvoltage occurs in the second alternating current, or undervoltage occurs in the second alternating current, or the voltage of the second alternating current is lost (no voltage exists), or the frequency of the second alternating current is abnormal, or wave form distortion occurs in the second alternating current.

A normal range of a voltage of the first high voltage direct current is 260-400 V. That the first high voltage direct current is normal means that the voltage of the first high voltage direct current is within the normal range. That the first high voltage direct current is abnormal means that the voltage of the first high voltage direct current is beyond the normal range.

The normal range of the voltage of the third high voltage direct current is 260-400 V. That the third high voltage direct current is normal means that the voltage of the third high voltage direct current is within the normal range. That the third high voltage direct current is abnormal means that the voltage of the third high voltage direct current is beyond the normal range.

Further, referring to FIG. 4, in the foregoing embodiment of the power supply apparatus of the present invention, a first EMI module and a second EMI module are further included, where:

the first EMI module is configured to filter the third high voltage direct current, and output the filtered third high voltage direct current to the selecting module; and the second EMI module is configured to filter the input second alternating current (second AC), and output the filtered second alternating current to the rectifier module.

Further, the power supply apparatus may further include:

a PFC module, configured to perform power factor correction for a voltage after the second alternating current is rectified.

In the foregoing embodiment of the power supply apparatus of the present invention, the first EMI module is further configured for lightning protection, and the second EMI module is further configured for lightning protection.

Figure 5:
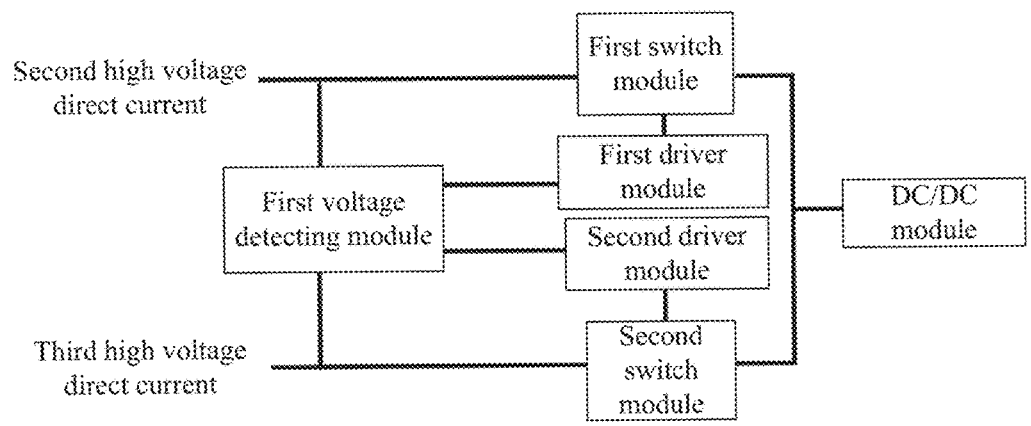
FIG. 5 is a schematic diagram of a selecting module according to an embodiment of the present invention.

In the foregoing embodiment of the power supply apparatus of the present invention, the selecting module may be implemented in two manners, where the first implementation manner is as follows:

Referring to FIG. 5, the selecting module includes:

a first voltage detecting module, configured to detect the voltage of the second high voltage direct current and that of the third high voltage direct current, and when detecting that the voltage of the second high voltage direct current is normal, output a disconnection signal to a second driver module and output a connection signal to a first driver module; when detecting that the voltage of the second high voltage direct current is abnormal, output a disconnection signal to the first driver module and output a connection signal to the second driver module;

the first driver module, configured to trigger, when receiving the disconnection signal, a first switch module to disconnect a channel for inputting the second high voltage direct current to the DC/DC module, and trigger, when receiving the connection signal and after the channel for inputting the third high voltage direct current to the DC/DC module is disconnected, the first switch module to connect the channel for inputting the second high voltage direct current to the DC/DC module;

the second driver module, configured to trigger, when receiving the connection signal and after the channel for inputting the second high voltage direct current to the DC/DC module is disconnected, a second switch module to connect the channel for inputting the third high voltage direct current to the DC/DC module, and trigger, when receiving the disconnection signal, the second switch module to disconnect the channel for inputting the third high voltage direct current to the DC/DC module;

the first switch module, connected between the second high voltage direct current and the DC/DC module, and configured to respond to driving of the first driver module, disconnect the channel for inputting the second high voltage direct current to the DC/DC module, and connect the channel for inputting the second high voltage direct current to the DC/DC module; and the second switch module, connected between the third high voltage direct current and the DC/DC module, and configured to respond to driving of the second driver module, disconnect the channel for inputting the third high voltage direct current to the DC/DC module, and connect the channel for inputting the third high voltage direct current to the DC/DC module.

The first switch module and the second switch module may be implemented by using a MOSFET or by using a relay.

The connecting the channel for inputting the second high voltage direct current to the DC/DC module includes: simultaneously connecting a channel between an anode of the second high voltage direct current and an anode of an input end of the DC/DC module, and a channel between a cathode of the second high voltage direct current and a cathode of the input end of the DC/DC module. The disconnecting the channel for inputting the second high voltage direct current to the DC/DC module includes: simultaneously disconnecting the channel between the anode of the second high voltage direct current and the anode of the input end of the DC/DC module, and the channel between the cathode of the second high voltage direct current and the cathode of the input end of the DC/DC module.

The connecting the channel for inputting the third high voltage direct current to the DC/DC module includes: simultaneously connecting a channel between an anode of the third high voltage direct current and the anode of the input end of the DC/DC module, and a channel between a cathode of the third high voltage direct current and the cathode of the input end of the DC/DC module. The disconnecting the channel for inputting the third high voltage direct current to the DC/DC module includes: simultaneously disconnecting the channel between the anode of the third high voltage direct current and the anode of the input end of the DC/DC module, and the channel between the cathode of the third high voltage direct current and the cathode of the input end of the DC/DC module.

Figure 6:
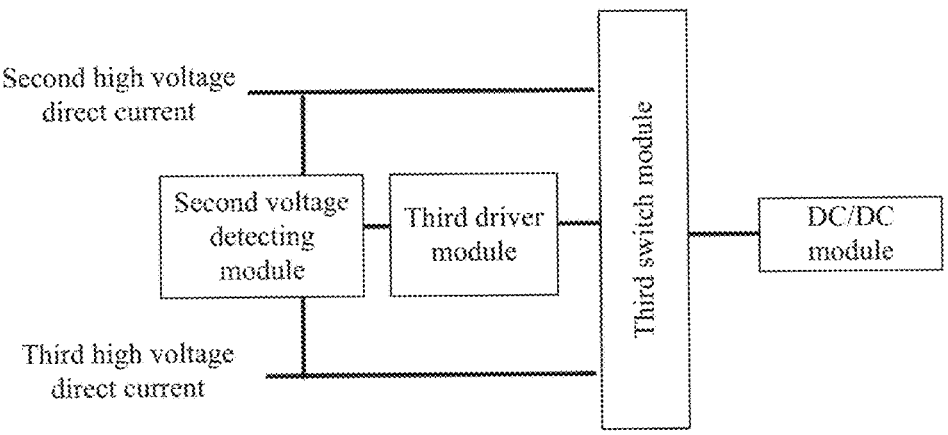
FIG. 6 is a schematic diagram of another selecting module according to an embodiment of the present invention.

The second implementation manner is as follows:

Referring to FIG. 6, the selecting module includes:

a second voltage detecting module, configured to: detect the voltage of the second high voltage direct current and that of the third high voltage direct current, and when detecting that the voltage of the second high voltage direct current is normal, output, to a third driver module, a signal for disconnecting the channel for inputting the third high voltage direct current to the DC/DC module, and a signal for connecting the channel for inputting the second high voltage direct current to the DC/DC module; when detecting that the voltage of the second high voltage direct current is abnormal, output, to the third driver module, a signal for disconnecting the channel for inputting the second high voltage direct current to the DC/DC module, and a signal for connecting the channel for inputting the third high voltage direct current to the DC/DC module;

the third driver module, configured to: trigger, when receiving the signal for disconnecting the channel for inputting the second high voltage direct current to the DC/DC module, and the signal for connecting the channel for inputting the third high voltage direct current to the DC/DC module, a third switch module to disconnect the channel for inputting the second high voltage direct current to the DC/DC module, and then trigger the third switch module to connect the channel for inputting the third high voltage direct current to the DC/DC module; and trigger, when receiving the signal for disconnecting the channel for inputting the third high voltage direct current to the DC/DC module, and the signal for connecting the channel for inputting the second high voltage direct current to the DC/DC module, the third switch module to disconnect the channel for inputting the third high voltage direct current to the DC/DC module, and then trigger the third switch module to connect the channel for inputting the second high voltage direct current to the DC/DC module; and the third switch module, connected between two high voltage direct currents and the DC/DC module, where the two high voltage direct currents are the second high voltage direct current and the third high voltage direct current, and configured to respond to driving of the third driver module, disconnect the channel for inputting the second high voltage direct current to the DC/DC module, and then connect the channel for inputting the third high voltage direct current to the DC/DC module; and respond to driving of the third driver module, disconnect the channel for inputting the third high voltage direct current to the DC/DC module, and then connect the channel for inputting the second high voltage direct current to the DC/DC module.

The third switch module may be implemented by using a MOSFET or by using a relay.

The connecting the channel for inputting the second high voltage direct current to the DC/DC module includes: simultaneously connecting a channel between an anode of the second high voltage direct current and an anode of an input end of the DC/DC module, and a channel between a cathode of the second high voltage direct current and a cathode of the input end of the DC/DC module. The disconnecting the channel for inputting the second high voltage direct current to the DC/DC module includes: simultaneously disconnecting the channel between the anode of the second high voltage direct current and the anode of the input end of the DC/DC module, and the channel between the cathode of the second high voltage direct current and the cathode of the input end of the DC/DC module.

The connecting the channel for inputting the third high voltage direct current to the DC/DC module includes: simultaneously connecting a channel between an anode of the third high voltage direct current and the anode of the input end of the DC/DC module, and a channel between a cathode of the third high voltage direct current and the cathode of the input end of the DC/DC module. The disconnecting the channel for inputting the third high voltage direct current to the DC/DC module includes: simultaneously disconnecting the channel between the anode of the third high voltage direct current and the anode of the input end of the DC/DC module, and the channel between the cathode of the third high voltage direct current and the cathode of the input end of the DC/DC module.

Power Supply System

Figure 7:
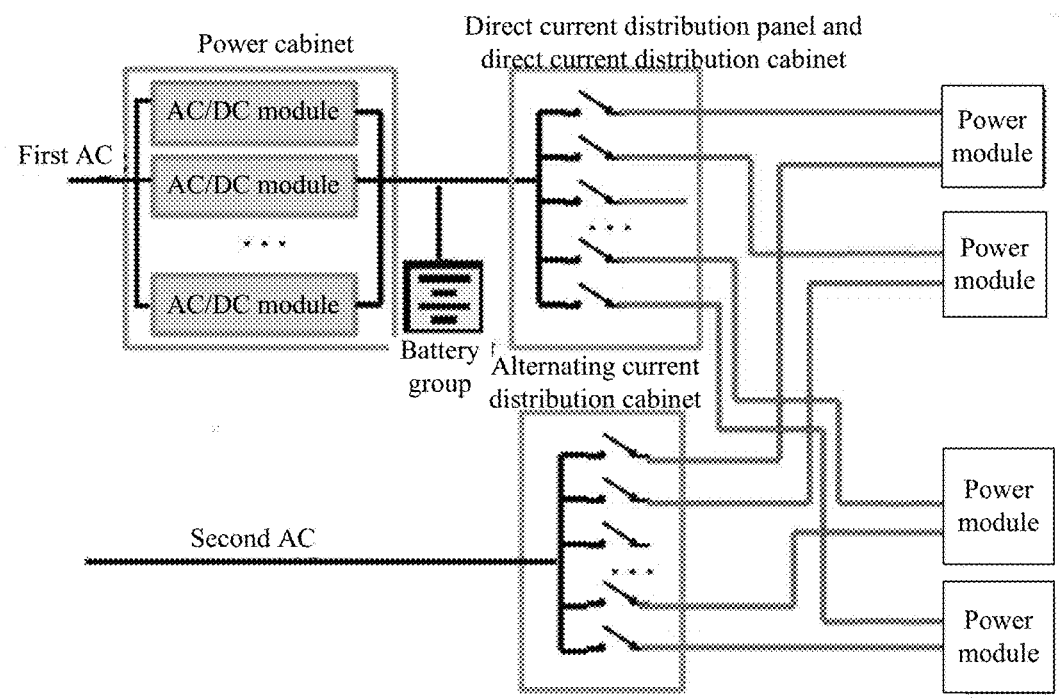
FIG. 7 is a schematic diagram of a power supply system according to an embodiment of the present invention.

Referring to FIG. 7, an embodiment of the present invention further provides a power supply system, including X AC/DC modules, W power modules, a power supply bus, and a battery group, where:

the power module is configured to adjust at least one input voltage and output the at least one input voltage to a load to supply power to the load, where the power module includes a rectifier module, a selecting module, and a DC/DC module;

the AC/DC module is configured to convert an input first alternating current (first AC) into a first high voltage direct current (first HVDC) for outputting;

where X first high voltage direct currents output by the X AC/DC modules are input to the power supply bus;

the battery group is configured to output a standby high voltage direct current when the first high voltage direct currents output by the X AC/DC modules are abnormal;

a third high voltage direct current (third HVDC) is output after the battery group and the power supply bus are connected in parallel, where the third high voltage direct current is input to the W power modules;

the rectifier module is configured to rectify an input second alternating current (second AC), and convert the second alternating current into a second high voltage direct current (second HVDC) for outputting;

the selecting module is connected to channels for inputting two high voltage direct currents to the DC/DC module, where the two high voltage direct currents include the second high voltage direct current and the third high voltage direct current;

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to the load for use;

where X and W are integers greater than 0.

In the foregoing embodiment of the power supply system of the present invention, an implementation manner of the selecting module in the foregoing embodiment of the power supply apparatus may be used for the selecting module.

In the foregoing embodiment of the power supply system of the present invention, two voltages, that is, a voltage of a second alternating current and that of the third high voltage direct current, which back up each other, enter a power module. Because two power supply voltages backing up each other may be connected to the power module, more voltages may be connected to fewer power modules, thereby saving a power supply cost. Further, because fewer power modules are used, a size of an equipment containing the power modules may also be reduced.

Further, because the power supply branch of the second alternating current does not require power backup, the power supply branch of the third high voltage direct current uses a battery group for power backup. Because neither of the two power supply branches uses a relatively expensive UPS equipment for power backup, and only the power supply branch of the third high voltage direct current uses a battery group for power backup, the power supply cost is low. Furthermore, when the second alternating current is normal, the second alternating current supplies power. In this case, only a few power conversion steps exist, and power supply and distribution efficiency is improved.

In the foregoing embodiment of the power supply system of the present invention, the X AC/DC modules implement parallel current equalization between the X AC/DC modules by using a current equalization bus.

Further, referring to FIG. 7, in the foregoing embodiment of the power supply system of the present invention, a first EMI module and a second EMI module are further included, where:

the first EMI module is configured to filter the third high voltage direct current, and output the filtered third high voltage direct current to the selecting module; and the second EMI module is configured to filter the input second alternating current (second AC), and output the filtered second alternating current to the rectifier module.

Further, the power supply system may further include:

a PFC module, configured to perform power factor correction for a voltage after the second alternating current is rectified.

In the foregoing embodiment of the power supply system of the present invention, the first EMI module is further configured for lightning protection, and the second EMI module is further configured for lightning protection.

In the foregoing embodiment of the power supply system of the present invention, the first alternating current or the second alternating current may have different voltage specifications such as a 3-phase 380 V voltage, or a 3-phase 480 V voltage, or a single-phase 220 V voltage, or a single-phase 120 V voltage.

If power factor correction is performed for the second alternating current, when the second alternating current is 220 V, a normal range of a voltage of the second high voltage direct current is 350-450 V; when the second alternating current is 110 V, the normal range of the voltage of the second high voltage direct current is 130-250 V.

If power factor correction is not performed for the second alternating current, when the second alternating current is 220 V, the normal range of the voltage of the second high voltage direct current is 240-390 V; when the second alternating current is 110 V, the normal range of the voltage of the second high voltage direct current is 110-190 V.

In addition, according to load requirements, or according to bearing capabilities of the power supply apparatus and hardware in a power supply system in which the power supply apparatus is located, the normal range of the voltage of the second high voltage direct current and that of the third high voltage direct current may be adjusted.

That the second high voltage direct current is normal means that the voltage of the second high voltage direct current is within the normal range.

That the second high voltage direct current is abnormal means that the voltage of the second high voltage direct current is beyond the normal range. In this case, overvoltage occurs in the second alternating current, or undervoltage occurs in the second alternating current, or the voltage of the second alternating current is lost (no voltage exists), or a frequency of the second alternating current is abnormal, or wave form distortion occurs in the second alternating current.

A normal range of a voltage of the first high voltage direct current is 260-400 V. That the first high voltage direct current is normal means that the voltage of the first high voltage direct current is within the normal range. That the first high voltage direct current is abnormal means that the voltage of the first high voltage direct current is beyond the normal range.

The normal range of the voltage of the third high voltage direct current is 260-400 V. That the third high voltage direct current is normal means that the voltage of the third high voltage direct current is within the normal range. That the third high voltage direct current is abnormal means that the voltage of the third high voltage direct current is beyond the normal range.

In the foregoing embodiment of the present invention, each power module supports one alternating current (second alternating current) input and one HVDC direct current (third high voltage direct current) input. After the second alternating current passes through the EMI module, the rectifier module, and the PFC module in the power module, the second high voltage direct current with a relatively stable voltage is output. The third high voltage direct current is input to the selecting module after passing through the EMI module. The selecting module performs detection and selection control for the second high voltage direct current and the third high voltage direct current. A voltage value of the second high voltage direct current is set in a normal range. Therefore, it is considered that the input second high voltage direct current is normal, and the selecting module controls the second high voltage direct current to be input to the DC/DC module after the selecting module. When an abnormality such as an input voltage fault or undervoltage or overvoltage occurs in the second AC, the corresponding rectifier and PFC modules have no PFC output or output an abnormal voltage due to the abnormality such as the input fault or the undervoltage or the overvoltage. In this case, the selecting module detects that the voltage of the second high voltage direct current is not within the normal range, and the selecting module determines that the input second high voltage direct current is faulty, and therefore, disconnects the channel for inputting the second high voltage direct current to the lower-level DC/DC module, and controls the third high voltage direct current to be input to the DC/DC module after the selecting module. When detecting that the voltage of the second high voltage direct current is restored to the set normal range, the selecting module disconnects the channel for inputting the third high voltage direct current to the lower-level DC/DC module, and inputs the second high voltage direct current to the lower-level DC/DC module again.

In the foregoing embodiment of the power supply system of the present invention, two power supply branches exist. One is a power supply branch A that uses the first alternating current as an input, and the other is a power supply branch B that uses the second alternating current as an input.

In the embodiment of the present invention, the power supply branch B supplies power when the second alternating current is normal, and the power supply branch A supplies power when the second alternating current is abnormal. In the power supply branch A, the first alternating current supplies power when the first alternating current is normal, and a battery group supplies power when the first alternating current is abnormal. That the first alternating current is abnormal means that: overvoltage occurs in the first alternating current, or undervoltage occurs in the first alternating current, or a voltage of the first alternating current is lost (no voltage exists), or a frequency of the first alternating current is abnormal, or wave form distortion occurs in the first alternating current. That the first alternating current is normal means that the first alternating current is in a state other than the abnormal state. That the second alternating current is abnormal means that: overvoltage occurs in the second alternating current, or undervoltage occurs in the second alternating current, or the voltage of the second alternating current is lost (no voltage exists), or the frequency of the second alternating current is abnormal, or wave form distortion occurs in the second alternating current. That the second alternating current is normal means that the second alternating current is in a state other than the abnormal state.

It can be seen that, the power supply branch A and the power supply branch B are no longer configured with a UPS power backup system. Therefore, the cost is saved, and power supply and distribution efficiency is improved.

In addition, because the AC/DC module and the battery group are connected in parallel, after the battery group is discharged, when the first alternating current is restored to normal, the first high voltage direct current output after the first alternating current passes through the AC/DC module charges the battery group, and the battery group enters a float charging state after being fully charged.

In the foregoing embodiment of the power supply system of the present invention, the DC/DC module converts the input second high voltage direct current or the third high voltage direct current into a low voltage direct current for outputting, where the low voltage direct current may be −48 V, or +12 V, or +54 V, or −54 V, and so on.

Figure 9:
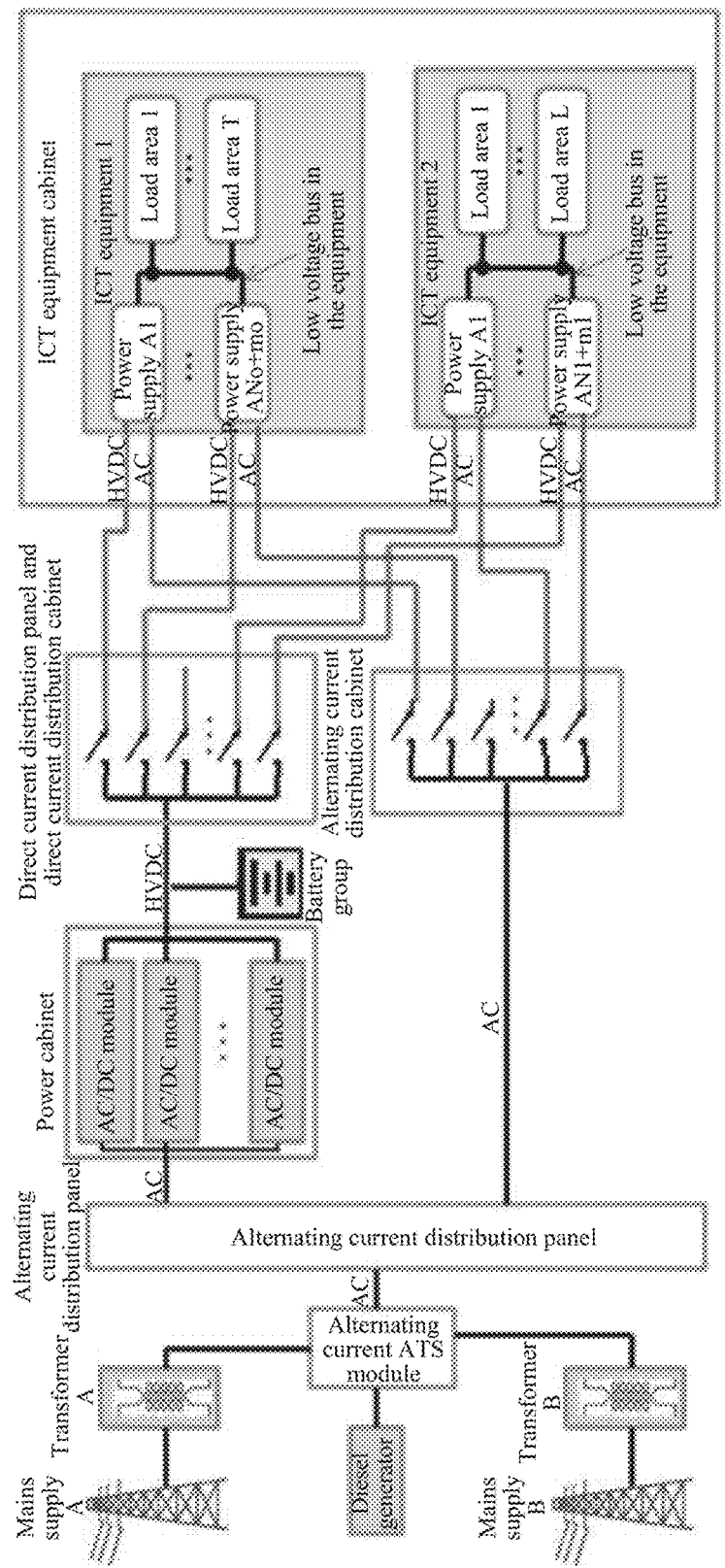
FIG. 9 is a schematic diagram of a specific implementation manner of the power supply system shown in FIG. 7.
Figure 10:
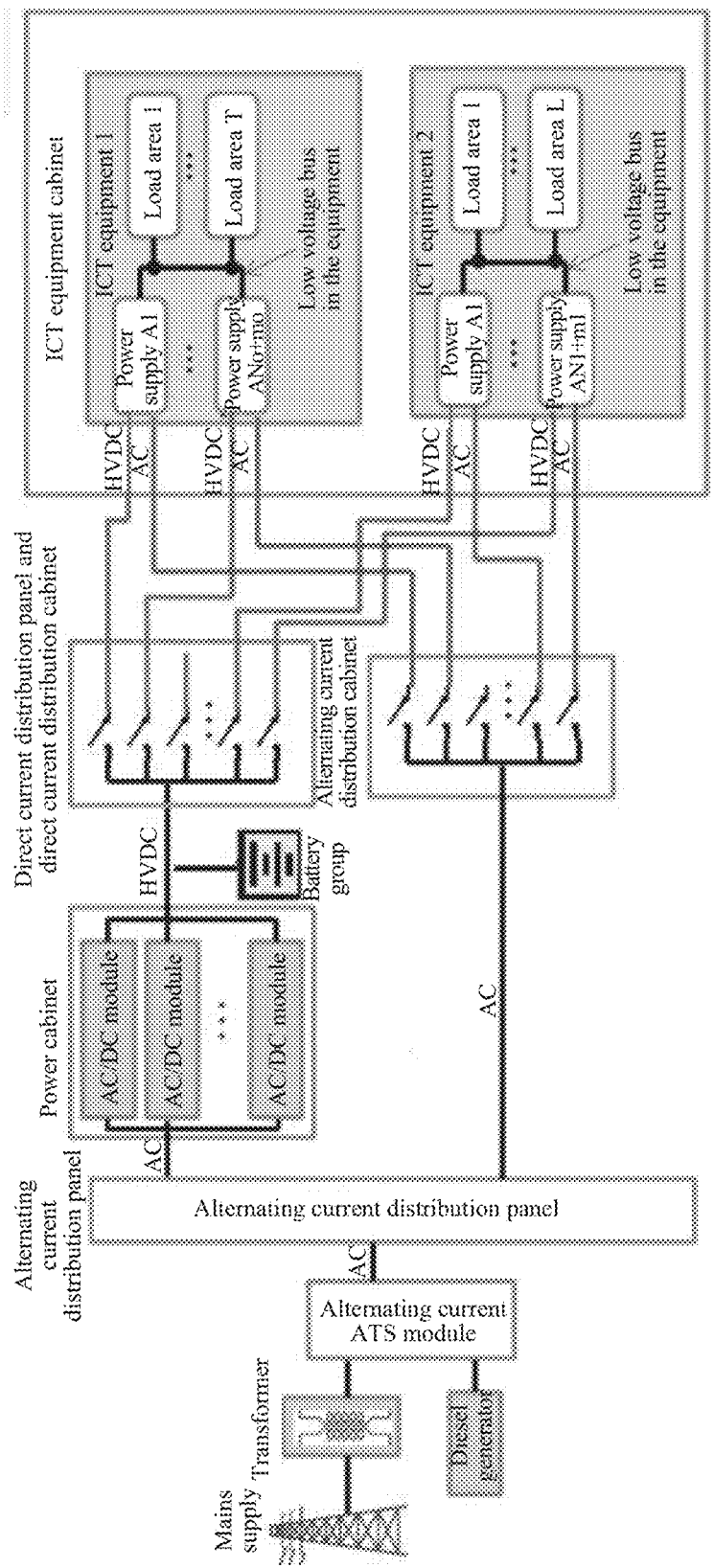
FIG. 10 is a schematic diagram of another specific implementation manner of the power supply system shown in FIG. 7.

Referring to FIG. 9 and FIG. 10, in the foregoing embodiment of the power supply system of the present invention, the W power modules may be distributed in different ICT equipments, where the ICT equipments may be located in a data center or an equipment room. For example, $N_0+m_0$ (where $N_0$ and $m_0$ are integers greater than 0, and $m_0$ is smaller than or equal to $N_0$) ("power supply A1" to "power supply $AN_0+m_0$" in the figures) power modules in the W power modules are disposed in a first ICT equipment (ICT equipment 1 in the figures), and $N_1+m_1$ (where $N_1$ and $m_1$ are integers greater than 0, and $m_1$ is smaller than or equal to $N_1$) ("power supply A1" to "power supply $AN_1+m_1$" in the figures) power modules in the W power modules are disposed in a second ICT equipment (ICT equipment 2 in the figures), and so on. $W=N_0+m_0+N_1+m_1+\ldots$.

$N_0$ power modules can satisfy power consumption requirements (electric power requirements) of the first ICT equipment, and the redundant $m_0$ power modules are used for redundant backup. Similarly, in the second ICT equipment, $N_1$ power modules can satisfy power consumption requirements (electric power requirements) of the second ICT equipment, and the redundant $m_1$ power modules are used for redundant backup.

Figure 11:
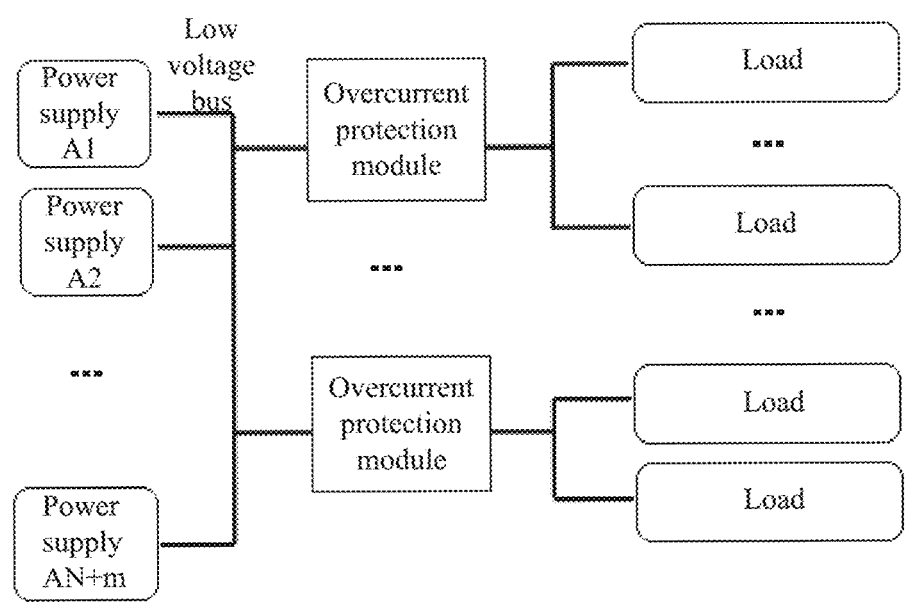
FIG. 11 is a schematic diagram of an ICT equipment according to an embodiment of the present invention.

Referring to FIG. 11, the W power modules may also be distributed in a same ICT equipment. For example, N+m (where N and m are integers greater than 0 and m is smaller than or equal to N) ("power supply A1" to "power supply AN+m" in the figure) power modules in the W power modules are distributed in the first ICT equipment, where W=N+m.

N power modules can satisfy power consumption requirements (electric power requirements) of an ICT equipment, and the redundant m power modules are used for redundant backup.

The ICT equipment may include but is not limited to a router, or a switch, or a server, and so on.

Referring to FIG. 9, FIG. 10, and FIG. 11, in the foregoing embodiment of the power supply system of the present invention, the ICT equipment may further include a low voltage bus. DC/DC modules of N0+m0 or N1+m1 or N+m power modules located in an ICT equipment output a low voltage direct current to the low voltage bus. Loads such as a board and a fan in the ICT equipment are connected to the low voltage bus so that power is supplied to the loads such as the board and the fan. An overcurrent protection module may be connected between at least one load and the low voltage bus, where the overcurrent protection module is configured to provide overcurrent protection for the at least one load connected to the overcurrent protection module. The overcurrent protection module may include a fuse, or a circuit breaker, and so on.

The ICT equipment may further include a current equalization bus. The $N_0+m_0$ or $N_1+m_1$ or N+m power modules located in an ICT equipment implement current equalization between the $N_0+m_0$ or $N_1+m_1$ or N+m power modules by using the current equalization bus, thereby ensuring even load sharing.

X, W, $N_0$, $N_1$, $m_0$, and $m_1$ are integers greater than 0.

Referring to FIG. 9, FIG. 10, and FIG. 11, the loads in the ICT equipments (for example, the ICT equipment 1 and the ICT equipment 2 in the figures) may be further divided into areas, for example, in the figures, a load area 1 to a load area T in the ICT equipment 1, and a load area 1 to a load area L in the ICT equipment 2. M and L are integers greater than 0. Each load area is connected to the low voltage bus so that power is supplied to the load area.

The load area includes at least one load, where the at least one load includes at least one electronic equipment, where the electronic equipment may be a board, or a fan, and so on.

An overcurrent protection module is connected between at least one load area in the multiple load areas and the low voltage bus, where the overcurrent protection module is configured to provide overcurrent protection for the at least one load area connected to the overcurrent protection module. The overcurrent protection module may include a fuse, or a circuit breaker, and so on.

Referring to FIG. 9 and FIG. 10, in the foregoing embodiment of the power supply system of the present invention, the X AC/DC modules may be disposed in a power cabinet.

In the foregoing embodiment of the power supply system of the present invention, a distribution module may be further included. The third high voltage direct current (third HVDC) may be output to the first EMI modules of the W power modules by using the distribution module.

The distribution module is configured to distribute the third high voltage direct current as W direct current branches of different capacities or a same capacity for outputting, where the W direct current branches are respectively input to the W power modules.

Referring to FIG. 9 and FIG. 10, the distribution module may be a first direct current distribution panel (the direct current distribution panel in the figures). The first direct current distribution panel may further provide overcurrent protection for the output direct current branches. In addition, the first direct current distribution panel may further have functions such as detecting the voltage and a current of the input third high voltage direct current.

Alternatively, the distribution module may also include a second direct current distribution panel (the direct current distribution panel in the figures) and P direct current distribution cabinets (the direct current distribution cabinets in the figures).

The second direct current distribution panel is configured to distribute the third high voltage direct current as Q direct current branches of different capacities or a same capacity. The Q direct current branches are respectively input to the P direct current distribution cabinets. In the Q direct current branches, one or multiple direct current branches may be input to a direct current distribution cabinet.

The direct current distribution cabinet is configured to distribute each input direct current branch as direct current branches of different capacities or a same capacity for outputting.

The total number of the direct current branches output by the P direct current distribution cabinets is W. The W direct current branches are respectively input to first EMI modules of the W power modules, where Q and P are integers greater than 0.

Further, the second direct current distribution panel may further provide overcurrent protection for the output direct current branches. In addition, the second direct current distribution panel may further have functions such as detecting the voltage and the current of the input third high voltage direct current. The direct current distribution cabinet may also further provide overcurrent protection for the output direct current branches. In addition, the direct current distribution cabinet may further have functions such as detecting a voltage and a current of the input direct current branches.

Referring to FIG. 9 and FIG. 10, in the foregoing embodiment of the power supply system of the present invention, an alternating current distribution cabinet is further included. The second alternating current is input to the second EMI modules of the W power modules by using the alternating current distribution cabinet.

The alternating current distribution cabinet is configured to distribute the input second alternating current as W alternating current branches of different capacities or a same capacity.

Further, the alternating current distribution cabinet may further provide overcurrent protection for the output alternating current branches. In addition, the alternating current distribution cabinet may further have functions such as detecting the voltage and a current of the input second alternating current.

Figure 8:
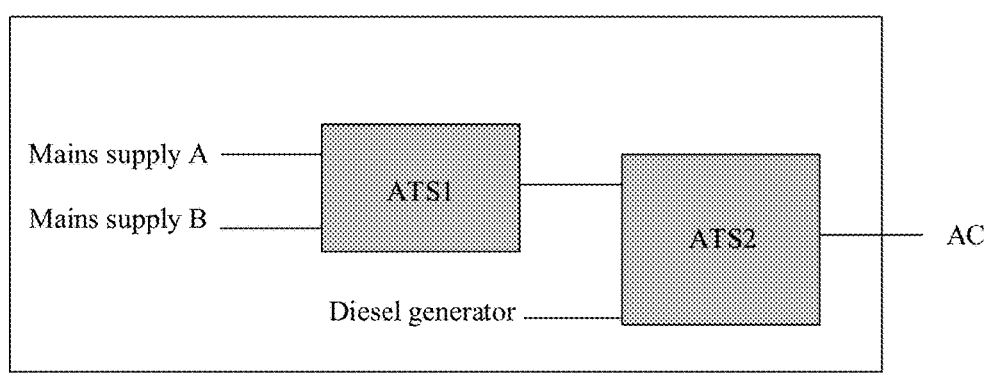
FIG. 8 is a schematic diagram of a first alternating current ATS module, a second alternating current ATS module, and a diesel generator according to an embodiment of the present invention.

In the foregoing embodiment of the power supply system of the present invention, a mains supply may be converted into the first alternating current and the second alternating current in the following two manners:

Referring to FIG. 8 and FIG. 9, in the first manner:

In the foregoing embodiment of the power supply system of the present invention, two mains supplies are input to the power supply system. The two mains supplies include a first mains supply A and a second mains supply B. The power supply system further includes a first alternating current ATS module, a second alternating current ATS module, and a diesel generator (where the first alternating current ATS module and the second alternating current ATS module are displayed together as "alternating current ATS module" in FIG. 9). The two mains supplies are input to the first alternating current ATS module.

The first alternating current ATS module (ATS1 in the figure) is configured to: receive the first mains supply A and the second mains supply B, output the first mains supply A to the second alternating current ATS module (ATS2 in the figure) when the first mains supply A is normal, and output the second mains supply B to the second alternating current ATS module when the first mains supply A is abnormal and the second mains supply B is normal, where neither the first mains supply A nor the second mains supply B is output when both the first mains supply A and the second mains supply B are abnormal.

The diesel generator is configured to generate power to generate an alternating current and output the alternating current to the second alternating current ATS module.

The second alternating current ATS module is configured to: when the first mains supply A is normal, output the first mains supply A input by the first alternating current ATS module; when the first mains supply A is abnormal and the second mains supply B is normal, output the second mains supply B input by the first alternating current ATS module; when both the first mains supply A and the second mains supply B are abnormal, output the alternating current generated by the diesel generator, where the first mains supply A or the second mains supply B output by the second alternating current ATS module or the alternating current generated by the diesel generator is divided into two branches, where one branch is the first alternating current and the other branch is the second alternating current.

That the first mains supply A is abnormal means that: overvoltage occurs in the first mains supply A, or undervoltage occurs in the first mains supply A, or a voltage of the first mains supply A is lost (no voltage exists), or a frequency of the first mains supply A is abnormal, or wave form distortion occurs in the first mains supply A. That the first mains supply A is normal means that the first mains supply A is in a state other than the abnormal state.

That the second mains supply B is abnormal means that: overvoltage occurs in the second mains supply B, or undervoltage occurs in the second mains supply B, or a voltage of the second mains supply B is lost (no voltage exists), or a frequency of the second mains supply B is abnormal, or wave form distortion occurs in the second mains supply B. That the second mains supply B is normal means that the second mains supply B is in a state other than the abnormal state.

It can be seen that, in the foregoing embodiment of the present invention, when the first mains supply A or the second mains supply B is normal, the mains supply is selected to supply power. The diesel generator is started to supply power only in a case in which both the first mains supply A and the second mains supply B are abnormal. However, there is a process from startup to power generation of the diesel generator. Therefore, a battery group supplies power before the diesel generator can generate power.

In the foregoing embodiment of the power supply system of the present invention, a first alternating current distribution panel is further included, where:

the first alternating current distribution panel is configured to distribute the first mains supply A or the second mains supply B output by the second alternating current ATS module or the alternating current generated by the diesel generator, as two alternating current branches, where one alternating current branch is the first alternating current and the other alternating current branch is the second alternating current; and the first alternating current distribution panel may further provide overcurrent protection for the output alternating current branches. In addition, the first alternating current distribution panel may further have functions such as implementing lightning protection or detection for the first mains supply A or the second mains supply B or the alternating current generated by the diesel generator.

Second Manner:

Referring to FIG. 10, in the foregoing embodiment of the power supply system of the present invention, a mains supply is input to the power supply system, and the mains supply system further includes a third alternating current ATS module (the alternating current ATS module in the figure) and a diesel generator, where the mains supply is input to the third alternating current ATS module.

The diesel generator is configured to generate power to generate an alternating current and output the alternating current to the third alternating current ATS module.

The third alternating current ATS module is configured to: when the mains supply is normal, output the input mains supply, or when the mains supply is abnormal, output the alternating current generated by the diesel generator, where the alternating current generated by the diesel generator and output by the third alternating current ATS module or the mains supply is divided into two branches, where one branch is the first alternating current and the other branch is the second alternating current.

That the mains supply is abnormal means that: overvoltage occurs in the mains supply, or undervoltage occurs in the mains supply, or a voltage of the mains supply is lost (no voltage exists), or a frequency of the mains supply is abnormal, or wave form distortion occurs in the mains supply. That the mains supply is normal means that the mains supply is in a state other than the abnormal state.

It can be seen that, in the foregoing embodiment of the present invention, when the mains supply is normal, the mains supply is selected to supply power. The diesel generator is started to supply power only in a case in which the mains supply is abnormal. However, there is a process from startup to power generation of the diesel generator. Therefore, a battery group supplies power before the diesel generator can generate power.

In the foregoing embodiment of the power supply system of the present invention, a third alternating current distribution panel is further included, where:

the third alternating current distribution panel is configured to distribute the mains supply output by the third alternating current ATS module or the alternating current generated by the diesel generator, as two alternating current branches, where one alternating current branch is the first alternating current and the other alternating current branch is the second alternating current; and the third alternating current distribution panel may further provide overcurrent protection for the output alternating current branches. In addition, the third alternating current distribution panel may further have functions such as implementing lightning protection or detection for the mains supply or the alternating current input by the diesel generator.

ICT Equipment

Referring to FIG. 9 and FIG. 10, an embodiment of the present invention further provides an ICT equipment. The ICT equipment includes N power modules and M loads, where:

the power module is configured to adjust at least one input voltage and output the at least one input voltage to a load to supply power to the load, where the N power modules supply power to the M loads, and the power module includes a rectifier module, a selecting module, and a DC/DC module, where:

the rectifier module is configured to rectify an input second alternating current (second AC), and convert the second alternating current into a second high voltage direct current (second HVDC) for outputting;

the selecting module is connected to channels for inputting two high voltage direct currents to the DC/DC module, where the two high voltage direct currents include the second high voltage direct current (second HVDC) and a third high voltage direct current (third HVDC);

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to the load for use;

where N and M are integers greater than 0.

In the foregoing embodiment of the ICT equipment of the present invention, an implementation manner of the selecting module in the foregoing embodiment of the power supply apparatus may be used for the selecting module.

In the foregoing embodiment of the ICT equipment of the present invention, two voltages, that is, a voltage of a second alternating current and that of the third high voltage direct current, which back up each other, enter a power module. Because two power supply voltages backing up each other may be connected to the power module, more voltages may be connected to fewer power modules, thereby saving a power supply cost. Further, because fewer power modules are used, a size of the ICT equipment containing the power modules may also be reduced.

In the foregoing embodiment of the ICT equipment of the present invention, the X AC/DC modules may implement parallel current equalization between the X AC/DC modules by using a current equalization bus.

Further, referring to FIG. 7, in the foregoing embodiment of the ICT equipment of the present invention, a first EMI module and a second EMI module are further included, where:

the first EMI module is configured to filter the third high voltage direct current, and output the filtered third high voltage direct current to the selecting module; and the second EMI module is configured to filter the input second alternating current (second AC), and output the filtered second alternating current to the rectifier module.

Further, the ICT equipment may further include:

a PFC module, configured to perform power factor correction for a voltage after the second alternating current is rectified.

In the foregoing embodiment of the ICT equipment of the present invention, the first EMI module may be further configured for lightning protection, and the second EMI module may also be further configured for lightning protection.

In the foregoing embodiment of the ICT equipment of the present invention, the first alternating current or the second alternating current may have different voltage specifications such as a 3-phase 380 V voltage, or a 3-phase 480 V voltage, or a single-phase 220 V voltage, or a single-phase 120 V voltage.

If power factor correction is performed for the second alternating current, when the second alternating current is 220 V, a normal range of a voltage of the second high voltage direct current is 350-450 V; when the second alternating current is 110 V, the normal range of the voltage of the second high voltage direct current is 130-250 V.

If power factor correction is not performed for the second alternating current, when the second alternating current is 220 V, the normal range of the voltage of the second high voltage direct current is 240-390 V; when the second alternating current is 110 V, the normal range of the voltage of the second high voltage direct current is 110-190 V.

In addition, according to load requirements, or according to bearing capabilities of the power supply apparatus and hardware in a power supply system or an ICT equipment in which the power supply apparatus is located, the normal range of the voltage of the second high voltage direct current and that of the third high voltage direct current may be adjusted.

That the second high voltage direct current is normal means that the voltage of the second high voltage direct current is within the normal range.

That the second high voltage direct current is abnormal means that the voltage of the second high voltage direct current is beyond the normal range. In this case, overvoltage occurs in the second alternating current, or undervoltage occurs in the second alternating current, or the voltage of the second alternating current is lost (no voltage exists), or a frequency of the second alternating current is abnormal, or wave form distortion occurs in the second alternating current.

A normal range of a voltage of the first high voltage direct current is 260-400 V. That the first high voltage direct current is normal means that the voltage of the first high voltage direct current is within the normal range. That the first high voltage direct current is abnormal means that the voltage of the first high voltage direct current is beyond the normal range.

The normal range of the voltage of the third high voltage direct current is 260-400 V. That the third high voltage direct current is normal means that the voltage of the third high voltage direct current is within the normal range. That the third high voltage direct current is abnormal means that the voltage of the third high voltage direct current is beyond the normal range.

In the foregoing embodiment of the present invention, each power module supports one alternating current (second alternating current) input and one HVDC direct current (third high voltage direct current) input. After the second alternating current passes through the EMI module, the rectifier module, and the PFC module in the power module, the second high voltage direct current with a relatively stable voltage is output. The third high voltage direct current is input to the selecting module after passing through the EMI module. The selecting module performs detection and selection control for the second high voltage direct current and the third high voltage direct current. A voltage value of the second high voltage direct current is set in a normal range. Therefore, it is considered that the input second high voltage direct current is normal, and the selecting module controls the second high voltage direct current to be input to the DC/DC module after the selecting module. When an abnormality such as an input voltage fault or undervoltage or overvoltage occurs in the second AC, the corresponding rectifier and PFC modules have no PFC output or output an abnormal voltage due to the abnormality such as the input fault or the undervoltage or the overvoltage. In this case, the selecting module detects that the voltage of the second high voltage direct current is not within the normal range, and the selecting module determines that the input second high voltage direct current is faulty, and therefore, disconnects the channel for inputting the second high voltage direct current to the lower-level DC/DC module, and controls the third high voltage direct current to be input to the DC/DC module after the selecting module. When detecting that the voltage of the second high voltage direct current is restored to the set normal range, the selecting module disconnects the channel for inputting the third high voltage direct current to the lower-level DC/DC module, and inputs the second high voltage direct current to the lower-level DC/DC module again.

In the foregoing embodiment of the ICT equipment of the present invention, two power supply branches exist. One is a power supply branch A that uses the first alternating current as an input, and the other is a power supply branch B that uses the second alternating current as an input.

In the embodiment of the present invention, the power supply branch B supplies power when the second alternating current is normal, and the power supply branch A supplies power when the second alternating current is abnormal. In the power supply branch A, the first alternating current supplies power when the first alternating current is normal, and a battery group supplies power when the first alternating current is abnormal. That the first alternating current is abnormal means that: overvoltage occurs in the first alternating current, or undervoltage occurs in the first alternating current, or a voltage of the first alternating current is lost (no voltage exists), or a frequency of the first alternating current is abnormal, or wave form distortion occurs in the first alternating current. That the first alternating current is normal means that the first alternating current is in a state other than the abnormal state. That the second alternating current is abnormal means that: overvoltage occurs in the second alternating current, or undervoltage occurs in the second alternating current, or the voltage of the second alternating current is lost (no voltage exists), or a frequency of the second alternating current is abnormal, or wave form distortion occurs in the second alternating current. That the second alternating current is normal means that the second alternating current is in a state other than the abnormal state.

It can be seen that, the power supply branch A and the power supply branch B are no longer configured with a UPS power backup system. Therefore, the cost is saved, and power supply and distribution efficiency is improved.

In addition, because the AC/DC module and the battery group are connected in parallel, after the battery group is discharged, when the first alternating current is restored to normal, the first high voltage direct current output after the first alternating current passes through the AC/DC module charges the battery group, and the battery group enters a float charging state after being fully charged.

In the foregoing embodiment of the ICT equipment of the present invention, the DC/DC module converts the input second high voltage direct current or the third high voltage direct current into a low voltage direct current for outputting, where the low voltage direct current may be −48 V, or +12 V, or +54 V, or −54 V, and so on.

Referring to FIG. 9 and FIG. 10, in the foregoing embodiment of the ICT equipment of the present invention, the W power modules may be distributed in different ICT equipments, where the ICT equipments may be located in a data center or an equipment room. For example, $N_0+m_0$ (where $N_0$ and $m_0$ are integers greater than 0, and $m_0$ is smaller than or equal to $N_0$) ("power supply A1" to "power supply $AN_0+m_0$" in the figures) power modules in the W power modules are disposed in a first ICT equipment (ICT equipment 1 in the figures), and $N_1+m_1$ (where $N_1$ and $m_1$ are integers greater than 0, and $m_1$ is smaller than or equal to $N_1$) ("power supply A1" to "power supply $AN_1+m_1$" in the figures) power modules in the W power modules are disposed in a second ICT equipment (ICT equipment 2 in the figures), and so on. $W=N_0+m_0+N_1+m_1+\ldots$.

$N_0$ power modules can satisfy power consumption requirements (electric power requirements) of the first ICT equipment, and the redundant $m_0$ power modules are used for redundant backup. Similarly, in the second ICT equipment, $N_1$ power modules can satisfy power consumption requirements (electric power requirements) of the second ICT equipment, and the redundant $m_1$ power modules are used for redundant backup.

Referring to FIG. 11, the W power modules may also be distributed in a same ICT equipment. For example, N+m (where N and m are integers greater than 0 and m is smaller than or equal to N) ("power supply A1" to "power supply AN+m" in the figure) power modules in the W power modules are distributed in the first ICT equipment, where W=N+m.

N power modules can satisfy power consumption requirements (electric power requirements) of an ICT equipment, and the redundant m power modules are used for redundant backup, where m is an integer greater than 0.

In the foregoing embodiment of the ICT equipment of the present invention, the ICT equipment may include but is not limited to a router, or a switch, or a server, and so on.

Referring to FIG. 9, FIG. 10, and FIG. 11, in the foregoing embodiment of the ICT equipment of the present invention, the ICT equipment may further include a low voltage bus. DC/DC modules of $N_0+m_0$ or $N_1+m_1$ or N+m power modules located in an ICT equipment output a low voltage direct current to the low voltage bus. M loads in the ICT equipment are connected to the low voltage bus so that power is supplied to the M loads. The M loads include loads such as a board and a fan in the ICT equipment. An overcurrent protection module is connected between at least one load in the M loads and the low voltage bus, where the overcurrent protection module is configured to provide overcurrent protection for the at least one load connected to the overcurrent protection module. The overcurrent protection module may include a fuse, or a circuit breaker, and so on.

The ICT equipment may further include a current equalization bus. The $N_0+m_0$ or $N_1+m_1$ or N+m power modules located in an ICT equipment implement current equalization between the $N_0+m_0$ or $N_1+m_1$ or N+m power modules by using the current equalization bus, thereby ensuring even load sharing.

X, W, $N_0$, $N_1$, $m_0$, and $m_1$ are integers greater than 0.

Referring to FIG. 9, FIG. 10, and FIG. 11, the M loads in the ICT equipments (for example, the ICT equipment 1 and the ICT equipment 2 in the figures) may be divided into multiple load areas, for example, in the figures, a load area 1 to a load area T in the ICT equipment 1, and a load area 1 to a load area L in the ICT equipment 2. T and L are integers greater than 0. Each load area is connected to the low voltage bus so that power is supplied to the load area.

The load area includes at least one load, where the at least one load includes at least one electronic equipment, where the electronic equipment may be a board, or a fan, and so on.

An overcurrent protection module is connected between at least one load area in the multiple load areas and the low voltage bus, where the overcurrent protection module is configured to provide overcurrent protection for the at least one load area connected to the overcurrent protection module. The overcurrent protection module may include a fuse, or a circuit breaker, and so on.

Referring to FIG. 9 and FIG. 10, in the foregoing embodiment of the ICT equipment of the present invention, the X AC/DC modules may be disposed in a power cabinet.

In the foregoing embodiment of the ICT equipment of the present invention, a distribution module may be further included. The third high voltage direct current (third HVDC) may be output to the first EMI modules of the W power modules by using the distribution module.

The distribution module is configured to distribute the third high voltage direct current as W direct current branches of different capacities or a same capacity for outputting, where the W direct current branches are respectively input to the W power modules.

Referring to FIG. 9 and FIG. 10, the distribution module may be a first direct current distribution panel (the direct current distribution panel in the figures). The first direct current distribution panel may further provide overcurrent protection for the output direct current branches. In addition, the first direct current distribution panel may further have functions such as detecting the voltage and a current of the input third high voltage direct current.

Alternatively, the distribution module may also include a second direct current distribution panel (the direct current distribution panel in the figures) and P direct current distribution cabinets (the direct current distribution cabinets in the figures).

The second direct current distribution panel is configured to distribute the third high voltage direct current as Q direct current branches of different capacities or a same capacity. The Q direct current branches are respectively input to the P direct current distribution cabinets. In the Q direct current branches, one or multiple direct current branches may be input to a direct current distribution cabinet.

The direct current distribution cabinet is configured to distribute each input direct current branch as direct current branches of different capacities or a same capacity for outputting.

The total number of the direct current branches output by the P direct current distribution cabinets is W. The W direct current branches are respectively input to the first EMI modules of the W power modules, where Q and P are integers greater than 0.

Further, the second direct current distribution panel may further provide overcurrent protection for the output direct current branches. In addition, the second direct current distribution panel may further have functions such as detecting the voltage and the current of the input third high voltage direct current. The direct current distribution cabinet may also further provide overcurrent protection for the output direct current branches. In addition, the direct current distribution cabinet may further have functions such as detecting a voltage and a current of the input direct current branches.

Referring to FIG. 9 and FIG. 10, in the foregoing embodiment of the ICT equipment of the present invention, an alternating current distribution cabinet is further included. The second alternating current is input to the second EMI modules of the W power modules by using the alternating current distribution cabinet.

The alternating current distribution cabinet is configured to distribute the input second alternating current as W alternating current branches of different capacities or a same capacity.

Further, the alternating current distribution cabinet may further provide overcurrent protection for the output alternating current branches. In addition, the alternating current distribution cabinet may further have functions such as detecting the voltage and a current of the input second alternating current.

A person of ordinary skill in the art may understand that, between multiple embodiments of the power supply method, power module, power supply apparatus, power supply system, and ICT equipment, mutual reference may be made for the specific steps and components.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disc, an optical disc, a read-only memory (Read-Only Memory, ROM), or a random access memory (Random Access Memory, RAM).

Only several embodiments of the present invention have been described, and a person skilled in the art may make various modifications or variations to the present invention according to the disclosure of the application document without departing from the spirit and scope of the present invention.

What is claimed is:

1. A power module, comprising a rectifier module, a selecting module, and a DC/DC (Direct Current/Direct Current) module, wherein:
    the rectifier module is configured to rectify an input alternating current, and convert the input alternating current into a first high voltage direct current for outputting;
    the selecting module is connected to channels for inputting two high voltage direct currents to the DC/DC module, wherein the two high voltage direct currents comprise the first high voltage direct current and a second high voltage direct current;
    the selecting module is configured to: when it is detected that the first high voltage direct current is normal, connect a channel for inputting the first high voltage direct current to the DC/DC module and disconnect a channel for inputting the second high voltage direct current to the DC/DC module; when it is detected that the first high voltage direct current is abnormal, connect the channel for inputting the second high voltage direct current to the DC/DC module and disconnect the channel for inputting the first high voltage direct current to the DC/DC module; and
    the DC/DC module is configured to convert the input first high voltage direct current or the second high voltage direct current into a low voltage direct current, and output the low voltage direct current to a load for use.

2. The power module according to claim 1, further comprising a first EMI (Electromagnetic Interference) module, wherein:
    the first EMI module is configured to filter the second high voltage direct current, and output the filtered second high voltage direct current to the selecting module.

3. The power module according to claim 1, further comprising:
    a second EMI module, configured to filter the input alternating current, and output the filtered alternating current to the rectifier module.

4. The power module according to claim 1, further comprising:
    a (Power Factor Correction) module, configured to perform power factor correction for a voltage after the alternating current is rectified.

5. The power module according to claim 1, wherein the selecting module comprises:
    a first voltage detecting module, configured to detect a voltage of the first high voltage direct current and that of the second high voltage direct current, and when detecting that the voltage of the first high voltage direct current is normal, output a disconnection signal to a second driver module and output a connection signal to a first driver module; when detecting that the voltage of the first high voltage direct current is abnormal, output a disconnection signal to the first driver module and output a connection signal to the second driver module;
    the first driver module, configured to trigger, when receiving the disconnection signal, a first switch module to disconnect the channel for inputting the first high voltage direct current to the DC/DC module, and trigger, when receiving the connection signal and after the channel for inputting the second high voltage direct current to the DC/DC module is disconnected, the first switch module to connect the channel for inputting the first high voltage direct current to the DC/DC module;
    the second driver module, configured to trigger, when receiving the connection signal and after the channel for inputting the first high voltage direct current to the DC/DC module is disconnected, a second switch module to connect the channel for inputting the second high voltage direct current to the DC/DC module, and trigger, when receiving the disconnection signal, the second switch module to disconnect the channel for inputting the second high voltage direct current to the DC/DC module;
    the first switch module, connected between the first high voltage direct current and the DC/DC module, and configured to respond to driving of the first driver module, disconnect the channel for inputting the first high voltage direct current to the DC/DC module, and connect the channel for inputting the first high voltage direct current to the DC/DC module; and
    the second switch module, connected between the second high voltage direct current and the DC/DC module, and configured to respond to driving of the second driver module, disconnect the channel for inputting the second high voltage direct current to the DC/DC module, and connect the channel for inputting the second high voltage direct current to the DC/DC module.

6. The power module according to claim 1, wherein the selecting module comprises:
    a second voltage detecting module, configured to: detect a voltage of the first high voltage direct current and that of the second high voltage direct current, and when detecting that the voltage of the first high voltage direct current is normal, output, to a second driver module, a signal for disconnecting the channel for inputting the second high voltage direct current to the DC/DC module, and a signal for connecting the channel for inputting the first high voltage direct current to the DC/DC module; when detecting that the voltage of the first high voltage direct current is abnormal, output, to a third driver module, a signal for disconnecting the channel for inputting the first high voltage direct current to the DC/DC module, and a signal for connecting the channel for inputting the second high voltage direct current to the DC/DC module;

the third driver module, configured to: trigger, when receiving the signal for disconnecting the channel for inputting the first high voltage direct current to the DC/DC module, and the signal for connecting the channel for inputting the second high voltage direct current to the DC/DC module, a third switch module to disconnect the channel for inputting the first high voltage direct current to the DC/DC module, and then trigger the third switch module to connect the channel for inputting the second high voltage direct current to the DC/DC module; and trigger, when receiving the signal for disconnecting the channel for inputting the second high voltage direct current to the DC/DC module, and the signal for connecting the channel for inputting the first high voltage direct current to the DC/DC module, the third switch module to disconnect the channel for inputting the second high voltage direct current to the DC/DC module, and then trigger the third switch module to connect the channel for inputting the first high voltage direct current to the DC/DC module; and the third switch module, connected between two high voltage direct currents and the DC/DC module, wherein the two high voltage direct currents are the first high voltage direct current and the second high voltage direct current, and configured to respond to driving of the third driver module, disconnect the channel for inputting the first high voltage direct current to the DC/DC module, and then connect the channel for inputting the second high voltage direct current to the DC/DC module; and respond to driving of the third driver module, disconnect the channel for inputting the second high voltage direct current to the DC/DC module, and then connect the channel for inputting the first high voltage direct current to the DC/DC module.

7. A power supply apparatus, comprising an AC/DC (Alternating Current/Direct Current) module, a battery group, a rectifier module, a selecting module, and a DC/DC (Direct Current/Direct Current) module, wherein:

the AC/DC module is configured to convert an input first alternating current into a first high voltage direct current for outputting;

the battery group is configured to output a standby high voltage direct current when the first high voltage direct current output by the AC/DC module is abnormal, wherein a third high voltage direct current is output after the battery group and the AC/DC module are connected in parallel;

the rectifier module is configured to rectify an input second alternating current, and convert the second alternating current into a second high voltage direct current for outputting;

the selecting module is connected to channels for inputting two high voltage direct currents to the DC/DC module, wherein the two high voltage direct currents comprise the second high voltage direct current and the third high voltage direct current;

the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and the DC/DC module is configured to convert the input second high voltage direct current or the third high voltage direct current into a low voltage direct current, and output the low voltage direct current to a load for use.

8. The power supply apparatus according to claim 7, further comprising a first EMI module, wherein:

the first EMI module is configured to filter the third high voltage direct current, and output the filtered third high voltage direct current to the selecting module.

9. The power supply apparatus according to claim 7, further comprising a second EMI (Electromagnetic Interference) module, wherein:

the second EMI module is configured to filter the input second alternating current, and output the filtered second alternating current to the rectifier module.

10. The power supply apparatus according to claim 7, further comprising:

a PFC (Power Factor Correction) module, configured to perform power factor correction for a voltage after the second alternating current is rectified.

11. The power supply apparatus according to claim 7, wherein the selecting module comprises:

a first voltage detecting module, configured to detect a voltage of the second high voltage direct current and that of the third high voltage direct current, and when detecting that the voltage of the second high voltage direct current is normal, output a disconnection signal to a second driver module and output a connection signal to a first driver module; when detecting that the voltage of the second high voltage direct current is abnormal, output a disconnection signal to the first driver module and output a connection signal to the second driver module;

the first driver module, configured to trigger, when receiving the disconnection signal, a first switch module to disconnect the channel for inputting the second high voltage direct current to the DC/DC module, and trigger, when receiving the connection signal and after the channel for inputting the third high voltage direct current to the DC/DC module is disconnected, the first switch module to connect the channel for inputting the second high voltage direct current to the DC/DC module;

the second driver module, configured to trigger, when receiving the connection signal and after the channel for inputting the second high voltage direct current to the DC/DC module is disconnected, a second switch module to connect the channel for inputting the third high voltage direct current to the DC/DC module, and trigger, when receiving the disconnection signal, the second switch module to disconnect the channel for inputting the third high voltage direct current to the DC/DC module;

the first switch module, connected between the second high voltage direct current and the DC/DC module, and configured to respond to driving of the first driver module, disconnect the channel for inputting the second high voltage direct current to the DC/DC module, and connect the channel for inputting the second high voltage direct current to the DC/DC module; and the second switch module, connected between the third high voltage direct current and the DC/DC module, and configured to respond to driving of the second driver module, disconnect the channel for inputting the third high voltage direct current to the DC/DC module, and connect the channel for inputting the third high voltage direct current to the DC/DC module.

12. The power supply apparatus according to claim 7, wherein the selecting module comprises:
   a second voltage detecting module, configured to: detect a voltage of the second high voltage direct current and that of the third high voltage direct current, and when detecting that the voltage of the second high voltage direct current is normal, output, to a third driver module, a signal for disconnecting the channel for inputting the third high voltage direct current to the DC/DC module, and a signal for connecting the channel for inputting the second high voltage direct current to the DC/DC module; when detecting that the voltage of the second high voltage direct current is abnormal, output, to the third driver module, a signal for disconnecting the channel for inputting the second high voltage direct current to the DC/DC module, and a signal for connecting the channel for inputting the third high voltage direct current to the DC/DC module;
   the third driver module, configured to: trigger, when receiving the signal for disconnecting the channel for inputting the second high voltage direct current to the DC/DC module, and the signal for connecting the channel for inputting the third high voltage direct current to the DC/DC module, a third switch module to disconnect the channel for inputting the second high voltage direct current to the DC/DC module, and then trigger the third switch module to connect the channel for inputting the third high voltage direct current to the DC/DC module; and trigger, when receiving the signal for disconnecting the channel for inputting the third high voltage direct current to the DC/DC module, and the signal for connecting the channel for inputting the second high voltage direct current to the DC/DC module, the third switch module to disconnect the channel for inputting the third high voltage direct current to the DC/DC module, and then trigger the third switch module to connect the channel for inputting the second high voltage direct current to the DC/DC module; and
   the third switch module, connected between two high voltage direct currents and the DC/DC module, wherein the two high voltage direct currents are the second high voltage direct current and the third high voltage direct current, and configured to respond to driving of the third driver module, disconnect the channel for inputting the second high voltage direct current to the DC/DC module, and then connect the channel for inputting the third high voltage direct current to the DC/DC module; and respond to driving of the third driver module, disconnect the channel for inputting the third high voltage direct current to the DC/DC module, and then connect the channel for inputting the second high voltage direct current to the DC/DC module.

13. A power supply system, comprising X AC/DC (Alternating Current/Direct Current) modules, W power modules, a power supply bus, and a battery group, wherein:
   each of the W power modules is configured to adjust at least one input voltage and output the at least one input voltage to a load to supply power to the load, wherein each of the W power modules comprises a rectifier module, a selecting module, and a DC/DC (Direct Current/Direct Current) module;
   each of the X AC/DC modules is configured to convert an input first alternating current into a first high voltage direct current for outputting;
   wherein X first high voltage direct currents output by the X AC/DC modules are input to the power supply bus;
   the battery group is configured to output a standby high voltage direct current when the first high voltage direct currents output by the X AC/DC modules are abnormal;
   a third high voltage direct current is output after the battery group and the power supply bus are connected in parallel, wherein the third high voltage direct current is input to the W power modules;
   the rectifier module is configured to rectify an input second alternating current, and convert the second alternating current into a second high voltage direct current for outputting;
   the selecting module is connected to channels for inputting two high voltage direct currents to the DC/DC module, wherein the two high voltage direct currents comprise the second high voltage direct current and the third high voltage direct current;
   the selecting module is configured to: when it is detected that the second high voltage direct current is normal, connect a channel for inputting the second high voltage direct current to the DC/DC module and disconnect a channel for inputting the third high voltage direct current to the DC/DC module; when it is detected that the second high voltage direct current is abnormal, connect the channel for inputting the third high voltage direct current to the DC/DC module and disconnect the channel for inputting the second high voltage direct current to the DC/DC module; and
   the DC/DC module is configured to convert the input second high voltage direct current or the third high voltage direct current into a low voltage direct current, and output the low voltage direct current to the load for use;
   wherein X and W are integers greater than 0.

14. The power supply system according to claim 13, further comprising a first EMI (Electromagnetic Interference) module, wherein:
   the first EMI module is configured to filter the third high voltage direct current, and output the filtered third high voltage direct current to the selecting module.

15. The power supply system according to claim 13, further comprising a second EMI module, wherein:
   the second EMI module is configured to filter the input second alternating current, and output the filtered second alternating current to the rectifier module.

16. The power supply system according to claim 13, further comprising:
   a PFC (Power Factor Correction) module, configured to perform power factor correction for a voltage after the second alternating current is rectified.

17. The power supply system according to claim 13, wherein the selecting module comprises:
   a first voltage detecting module, configured to detect a voltage of the second high voltage direct current and that of the third high voltage direct current, and when detecting that the voltage of the second high voltage direct current is normal, output a disconnection signal to a second driver module and output a connection signal to a first driver module; when detecting that the voltage of the second high voltage direct current is abnormal, output a disconnection signal to the first driver module and output a connection signal to the second driver module;

the first driver module, configured to trigger, when receiving the disconnection signal, a first switch module to disconnect the channel for inputting the second high voltage direct current to the DC/DC module, and trigger, when receiving the connection signal and after the channel for inputting the third high voltage direct current to the DC/DC module is disconnected, the first switch module to connect the channel for inputting the second high voltage direct current to the DC/DC module;

the second driver module, configured to trigger, when receiving the connection signal and after the channel for inputting the second high voltage direct current to the DC/DC module is disconnected, a second switch module to connect the channel for inputting the third high voltage direct current to the DC/DC module, and trigger, when receiving the disconnection signal, the second switch module to disconnect the channel for inputting the third high voltage direct current to the DC/DC module;

the first switch module, connected between the second high voltage direct current and the DC/DC module, and configured to respond to driving of the first driver module, disconnect the channel for inputting the second high voltage direct current to the DC/DC module, and connect the channel for inputting the second high voltage direct current to the DC/DC module; and the second switch module, connected between the third high voltage direct current and the DC/DC module, and configured to respond to driving of the second driver module, disconnect the channel for inputting the third high voltage direct current to the DC/DC module, and connect the channel for inputting the third high voltage direct current to the DC/DC module.

18. The power supply system according to claim 13, wherein the selecting module comprises:
a second voltage detecting module, configured to: detect a voltage of the second high voltage direct current and that of the third high voltage direct current, and when detecting that the voltage of the second high voltage direct current is normal, output, to a third driver module, a signal for disconnecting the channel for inputting the third high voltage direct current to the DC/DC module, and a signal for connecting the channel for inputting the second high voltage direct current to the DC/DC module; when detecting that the voltage of the second high voltage direct current is abnormal, output, to the third driver module, a signal for disconnecting the channel for inputting the second high voltage direct current to the DC/DC module, and a signal for connecting the channel for inputting the third high voltage direct current to the DC/DC module;

the third driver module, configured to: trigger, when receiving the signal for disconnecting the channel for inputting the second high voltage direct current to the DC/DC module, and the signal for connecting the channel for inputting the third high voltage direct current to the DC/DC module, a third switch module to disconnect the channel for inputting the second high voltage direct current to the DC/DC module, and then trigger the third switch module to connect the channel for inputting the third high voltage direct current to the DC/DC module; and trigger, when receiving the signal for disconnecting the channel for inputting the third high voltage direct current to the DC/DC module, and the signal for connecting the channel for inputting the second high voltage direct current to the DC/DC module, the third switch module to disconnect the channel for inputting the third high voltage direct current to the DC/DC module, and then trigger the third switch module to connect the channel for inputting the second high voltage direct current to the DC/DC module; and the third switch module, connected between two high voltage direct currents and the DC/DC module, wherein the two high voltage direct currents are the second high voltage direct current and the third high voltage direct current, and configured to respond to driving of the third driver module, disconnect the channel for inputting the second high voltage direct current to the DC/DC module, and then connect the channel for inputting the third high voltage direct current to the DC/DC module; and respond to driving of the third driver module, disconnect the channel for inputting the third high voltage direct current to the DC/DC module, and then connect the channel for inputting the second high voltage direct current to the DC/DC module.

19. The power supply system according to claim 13, wherein the X AC/DC modules are disposed in a power cabinet.

20. An ICT equipment, comprising N power modules and M loads, wherein:
a power module is configured to adjust at least one input voltage and output the at least one input voltage to a load to supply power to the load, wherein the N power modules supply power to the M loads, and the power module comprises a rectifier module, a selecting module, and a DC/DC (Direct Current/Direct Current) module, wherein:
the rectifier module is configured to rectify an input alternating current, and convert the alternating current into a first high voltage direct current for outputting;
the selecting module is connected to channels for inputting two high voltage direct currents to the DC/DC module, wherein the two high voltage direct currents comprise the first high voltage direct current and a second high voltage direct current;
the selecting module is configured to: when it is detected that the first high voltage direct current is normal, connect a channel for inputting the first high voltage direct current to the DC/DC module and disconnect a channel for inputting the second high voltage direct current to the DC/DC module; when it is detected that the first high voltage direct current is abnormal, connect the channel for inputting the second high voltage direct current to the DC/DC module and disconnect the channel for inputting the first high voltage direct current to the DC/DC module; and
the DC/DC module is configured to convert the input first high voltage direct current or the second high voltage direct current into a low voltage direct current, and output the low voltage direct current to the load for use;
wherein N and M are integers greater than 0.

21. The ICT equipment according to claim 20, wherein the power module further comprises a first EMI (Electromagnetic Interference) module, wherein:
the first EMI module is configured to filter the second high voltage direct current, and output the filtered second high voltage direct current to the selecting module.

22. The ICT equipment according to claim 20, wherein the power module further comprises:
a second EMI module, configured to filter the input alternating current, and output the filtered alternating current to the rectifier module.

23. The ICT equipment according to claim 20, wherein the power module further comprises:
a PFC (Power Factor Correction) module, configured to perform power factor correction for a voltage after the alternating current is rectified.

24. The ICT equipment according to claim 20, further comprising m power modules, wherein the m power modules are used for redundant backup, and m is an integer greater than zero.

25. The ICT equipment according to claim 24, further comprising a low voltage bus, wherein DC/DC modules of the N power modules and the m power modules output the low voltage direct current to the low voltage bus, and the M loads are connected to the low voltage bus so that power is supplied to the M loads.

26. The ICT equipment according to claim 25, wherein an overcurrent protection module is connected between at least one load in the M loads and the low voltage bus, wherein the overcurrent protection module is configured to provide overcurrent protection for the at least one load connected to the overcurrent protection module.

27. The ICT equipment according to claim 25, wherein the M loads are divided into multiple load areas, wherein each load area comprises at least one load, and each load area is connected to the low voltage bus so that power is supplied to the M loads.

28. The ICT equipment according to claim 27, wherein an overcurrent protection module is connected between at least one load area in the multiple load areas and the low voltage bus, wherein the overcurrent protection module is configured to provide overcurrent protection for the at least one load area connected to the overcurrent protection module.

29. The ICT equipment according to claim 20, wherein the selecting module comprises:
a first voltage detecting module, configured to detect a voltage of the first high voltage direct current and that of the second high voltage direct current, and when detecting that the voltage of the first high voltage direct current is normal, output a disconnection signal to a second driver module and output a connection signal to a first driver module; when detecting that the voltage of the first high voltage direct current is abnormal, output a disconnection signal to the first driver module and output a connection signal to the second driver module;
the first driver module, configured to trigger, when receiving the disconnection signal, a first switch module to disconnect the channel for inputting the first high voltage direct current to the DC/DC module, and trigger, when receiving the connection signal and after the channel for inputting the second high voltage direct current to the DC/DC module is disconnected, the first switch module to connect the channel for inputting the first high voltage direct current to the DC/DC module;
the second driver module, configured to trigger, when receiving the connection signal and after the channel for inputting the first high voltage direct current to the DC/DC module is disconnected, a second switch module to connect the channel for inputting the second high voltage direct current to the DC/DC module, and trigger, when receiving the disconnection signal, the second switch module to disconnect the channel for inputting the second high voltage direct current to the DC/DC module;
the first switch module, connected between the first high voltage direct current and the DC/DC module, and configured to respond to driving of the first driver module, disconnect the channel for inputting the first high voltage direct current to the DC/DC module, and connect the channel for inputting the first high voltage direct current to the DC/DC module; and
the second switch module, connected between the second high voltage direct current and the DC/DC module, and configured to respond to driving of the second driver module, disconnect the channel for inputting the second high voltage direct current to the DC/DC module, and connect the channel for inputting the second high voltage direct current to the DC/DC module.

30. The ICT equipment according to claim 20, wherein the selecting module comprises:
a second voltage detecting module, configured to: detect a voltage of the first high voltage direct current and that of the second high voltage direct current, and when detecting that the voltage of the first high voltage direct current is normal, output, to a third driver module, a signal for disconnecting the channel for inputting the second high voltage direct current to the DC/DC module, and a signal for connecting the channel for inputting the first high voltage direct current to the DC/DC module; when detecting that the voltage of the first high voltage direct current is abnormal, output, to the third driver module, a signal for disconnecting the channel for inputting the first high voltage direct current to the DC/DC module, and a signal for connecting the channel for inputting the second high voltage direct current to the DC/DC module;
the third driver module, configured to: trigger, when receiving the signal for disconnecting the channel for inputting the first high voltage direct current to the DC/DC module, and the signal for connecting the channel for inputting the second high voltage direct current to the DC/DC module, a third switch module to disconnect the channel for inputting the first high voltage direct current to the DC/DC module, and then trigger the third switch module to connect the channel for inputting the second high voltage direct current to the DC/DC module; and trigger, when receiving the signal for disconnecting the channel for inputting the second high voltage direct current to the DC/DC module, and the signal for connecting the channel for inputting the first high voltage direct current to the DC/DC module, the third switch module to disconnect the channel for inputting the second high voltage direct current to the DC/DC module, and then trigger the third switch module to connect the channel for inputting the first high voltage direct current to the DC/DC module; and
the third switch module, connected between two high voltage direct currents and the DC/DC module, wherein the two high voltage direct currents are the first high voltage direct current and the second high voltage direct current, and configured to respond to driving of the third driver module, disconnect the channel for inputting the first high voltage direct current to the DC/DC module, and then connect the channel for inputting the second high voltage direct current to the DC/DC module; and respond to driving of the third driver module, disconnect the channel for inputting the second high voltage direct current to the DC/DC module, and then connect the channel for inputting the first high voltage direct current to the DC/DC module.

* * * * *